US009760350B2

United States Patent
Lagergren et al.

(10) Patent No.: US 9,760,350 B2
(45) Date of Patent: Sep. 12, 2017

(54) OPTIMISTICALLY ASSUMING TYPES IN A DYNAMICALLY TYPED LANGUAGE

(71) Applicant: Oracle International Corporation, Redwood City, CA (US)

(72) Inventors: Marcus Lagergren, Stockholm (SE); Attila Szegedi, Stockholm (SE)

(73) Assignee: Oracle International Corporation, Redwood City, CA (US)

( * ) Notice: Subject to any disclaimer, the term of this patent is extended or adjusted under 35 U.S.C. 154(b) by 155 days.

(21) Appl. No.: 14/743,912

(22) Filed: Jun. 18, 2015

(65) Prior Publication Data
US 2015/0378694 A1 Dec. 31, 2015

Related U.S. Application Data

(60) Provisional application No. 62/017,773, filed on Jun. 26, 2014.

(51) Int. Cl.
*G06F 9/45* (2006.01)
*G06F 9/455* (2006.01)

(52) U.S. Cl.
CPC .......... *G06F 8/437* (2013.01); *G06F 9/45516* (2013.01)

(58) Field of Classification Search
CPC ....................................... G06F 8/437
USPC ........................................... 717/143
See application file for complete search history.

(56) References Cited

U.S. PATENT DOCUMENTS

| 5,579,518 A * | 11/1996 | Yasumatsu | G06F 9/4431 712/E9.085 |
| 8,677,335 B1 * | 3/2014 | Millikin | G06F 8/45 717/150 |
| 2003/0154468 A1 * | 8/2003 | Gordon | G06F 9/44589 717/143 |
| 2012/0030653 A1 | 2/2012 | Porras et al. | |

OTHER PUBLICATIONS

"TypeInference," From MozillaWiki, downloaded Jun. 16, 2015 from https://wiki.mozilla.org/TypeInterference, document last modified Dec. 15, 2010, pp. 1-3.
Dr. Cliff Click, Cliff Click's Blog, "What the heck is OSR and why is it Bad (or Good)?," Nov. 22, 2011, pp. 1-9.
"Efficient and General On-Stack Replacement for Aggressive Program Specialization," Sunil Soman and Chandra Krintz, 2006 International Conference on Programming Languages and Compilers (PLC'06), Jun. 26-29, 2006, Las Vegas, NV, pp. 1-9.

* cited by examiner

*Primary Examiner* — Timothy A Mudrick
(74) *Attorney, Agent, or Firm* — Robert C. Kowert; Meyertons, Hood, Kivlin, Kowert & Goetzel, P.C.

(57) ABSTRACT

Optimistically type assumptions in a dynamically typed language may involve a compiler parsing code and detecting a program element that results from an operation of the code that has an unspecified type. In response, the compiler may make a first type assumption treating the element as a first type. The assumed type may be selected from multiple types as expected to have a lowest performance cost of the multiple types. The compiler may generate compiled code using the first (assumed) type. During runtime of the compiled code, it may be detected that the first type assumption is invalid for the compiled code and in response a portion of the compiled code may be replaced with other compiled code. The other compiled code may treat the element according to a second type assumption that may be selected as a type expected to have the second lowest performance cost.

20 Claims, 10 Drawing Sheets

OPTIMISTICALLY ASSUMING TYPES IN A DYNAMICALLY TYPED LANGUAGE

PRIORITY INFORMATION

This application claims benefit of priority to the following provisional application, which is hereby incorporated by reference in its entirety: Ser. No. 62/017,773 filed Jun. 26, 2014 titled Optimistically Assuming Types in a Dynamically Typed Language.

BACKGROUND

The present invention relates generally to software development and more specifically to various aspects of language development regarding the use of a scripting language and a script engine executing within a virtual execution environment, such as using script engine for a dynamically typed, scripting language with an implementation of a statically typed, platform-independent, object-oriented programming language.

Traditionally, numbers in dynamically typed languages may have no fixed ranges. When executing bytecode generated from a dynamically typed language, overflow conditions may have to be handled. One traditional approach may be to treat all numeric arithmetic using doubles. In general, double arithmetic may be slower than integer arithmetic, thus incurring an additional performance cost. Furthermore, representing everything as objects, such as to get the resulting bytecode format type agnostic, may incur an even higher performance cost.

SUMMARY

When generating bytecode for a dynamically typed language optimistic type assumptions may be made and during execution, incorrect assumptions may be corrected as needed using less optimistic types.

In a dynamically typed language optimistic type assumptions may be made (e.g., by an interpreter or compiler) for statically unprovable types, such that the assumptions use as narrow a type as possible. In response to determining that an initial type assumption is wrong, a wider type assumption may then be made and the code regenerated and execution may continue. This process may be repeated using wider and wider type assumptions until the code executes without determining that the assumption is invalid.

DETAILED DESCRIPTION OF EMBODIMENTS

Figure 1:
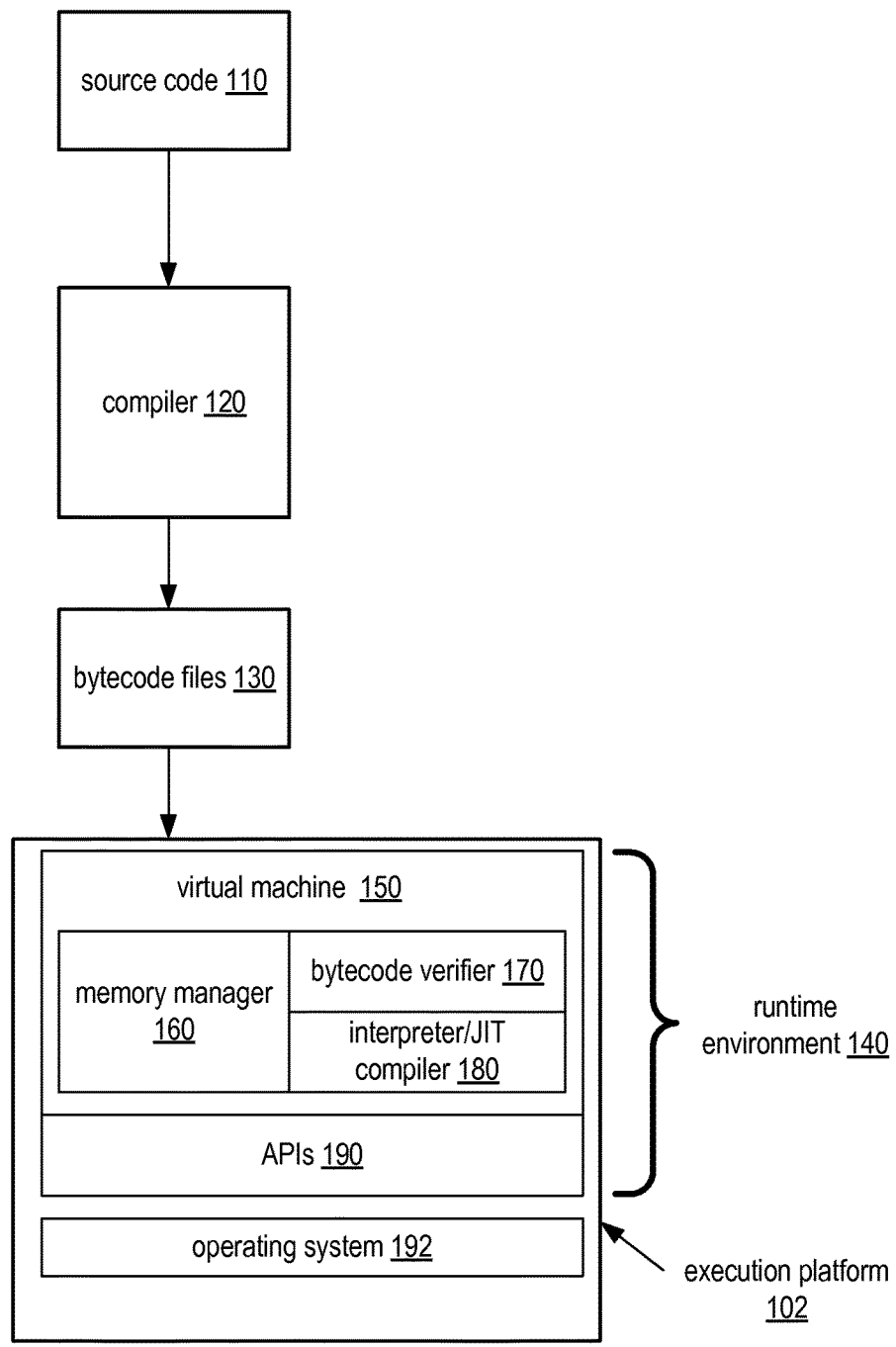
FIG. 1 is a logical block diagram illustrating a workflow for compiling and executing a computer program specified in a high-level object-oriented, according to various embodiments.

Described herein are various embodiments of enhancements to software development and/or execution using dynamically typed programming languages to support various features, such as (for example) implementing optimistic type assumptions.

Optimistic type assumptions may be implemented for a dynamically typed language by selecting a first candidate type based on a first type assumption from among multiple possible types. The first candidate type may be selected as being expected to have a lower (or the lowest) performance cost (e.g., exhibit the highest performance) of the multiple types. The compiler may then generate first candidate compiled code using the first candidate type.

During runtime of the first candidate compiled code, it may be detected that the first type assumption is invalid for the first candidate compiled code. In response at least a portion of the first candidate compiled code may be replaced with second candidate compiled code treating the element according to a second type assumption. The second type assumption may assume a second type that is selected based on the operation and/or a result (e.g., a result value) of the operation. For example, the second type may be selected from multiple types as a type expected to have the second lowest performance cost. Furthermore, the replacement compiled code is then executed in such a manner that execution continues from a point at which the invalidity of the first type assumption was detected.

This process may be repeated multiple types, according to some embodiments. Thus, if the second type assumption is determined to be invalid for the second candidate compiled code, a third type assumption may be made and third candidate compiled code may be generated and used.

The methods and/or features described herein may involve various aspects of language development. Various embodiments of the methods, techniques, features and/or enhancements described herein are discussed in terms of dynamically typed language, such as the JavaScript™ programming language, and/or using features of software development using such a language. However, the methods, techniques, features and other enhancements described herein may also be used with other programming languages, such as Perl, PHP, Ruby, C, C++, C#, Scala®, Python, according to various embodiments.

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

While the embodiments described herein in the detailed description and examples reflect distinct groups of features, these groupings of features are abstractions for the purpose of clarifying some features by elision from view of others that would be practiced in conjunction, and one of skill in the art will readily ascertain in light of having read the present specification that combinations of features described herein different from the particular combinations described herein are contemplated within the scope and intent of this disclosure. Thus, features from different parts of this disclosure and its appendices may be combined without departing from the scope and intent of this disclosure, and one of skill in the art will readily comprehend in light of this disclosure that different elements of the disclosure and its appendices may be combined in ways not clarified herein to preserve the clarity of discussion of the features themselves.

Types Assumptions

One mechanism for optimistically assuming types in a dynamically typed language (such as may be implemented as Java bytecode) may include assuming as narrow a type as possible for statically unprovable types, throwing an exception when that assumption is wrong, regenerating the code with a wider type assumption, and executing the regenerated code. This process may be repeated until an assumption is valid (or until no more assumptions are possible) and the system is stable.

In some embodiments, it may be impossible to prove that a type assumption is valid for all possible cases. Instead, a process trying one type assumption and replacing it if it proves invalid may be repeated until the code completes execution without determining that the current type assumption in invalid. In other words, while a current type assumption may have been invalid for a one execution run (e.g., under different conditions or with different data) if the code executes without detecting that the current type assumption is invalid, the type assumption may be deemed to be valid, according to some embodiments.

Example Implementing Architecture

FIG. 1 illustrates a workflow for compiling and executing a computer program specified in a high-level object-oriented language that supports primitive and reference data types, and various methods, features and enhancements regarding specialization of generic classes when instantiated with primitive type parameters as described herein, according to various embodiments. For purposes of illustration, the following description is provided largely in the context of using the Java™ programming language; however, it is noted that the techniques described may be used for any programming language that supports primitive and reference types and specialization in any appropriate context.

According to the illustrated embodiment, the workflow begins when a compiler, such as compiler 120, receives source code 110 for a computer program. In various embodiments, source code 110 may be specified in various high-level and/or object-oriented programming languages, such as Java™ and/or other languages. Source code may be provided as a set of .java files in embodiments where Java™ is being used. In some embodiments, source code 110 may be specified using a combination of languages, which may include one or more low-level and/or intermediate languages (e.g., assembly). In some embodiments, at least some of the source code may initially be written in a dynamically-typed high-level language, such as Python or Ruby, while in other embodiments, all of the source code may be in a statically-typed language such as Java™.

The compiler 120 may analyze the source code 110 to produce an executable version of the program, such as bytecode files 130 (e.g., .class files or .jar files in the case of Java™) in the depicted embodiment. For example, bytecode files 130 may include one or more modules of compiled bytecode. However, different types of executable code formats may be used in various embodiments; for example, binary machine language may be used instead of bytecodes. In some scenarios, parts of the executable code may be in bytecode while others are in a native binary machine language. As part of compiling program source code 110 into executable code 130, the compiler 120 may perform a sequence of analysis operations and generate various intermediate data structures before generating the executable version.

As illustrated in FIG. 1, executable code 130 may be passed to an execution environment, such as runtime environment 140, which executes the code on an execution platform 102, thereby creating various output data and/or behavior. In various embodiments, the runtime environment 140 may include a virtual machine 150 (e.g., a Java™ Virtual Machine or JVM). The virtual machine 150 may in turn comprise a number of different components, such as a memory manager 160 (which may include a garbage collector), a bytecode verifier 170 to check the validity of the executable code, an interpreter and/or a just-in-time (JIT) compiler 180 such as the HotSpot compiler. The JIT compiler may in some embodiments be responsible for translating some or all of the bytecode (for example, heavily-used portions of bytecode) into platform-specific machine code to improve performance of the program execution. A runtime environment 140, such as the Java™ Runtime Environment or JRE, may also include code to implement a number of application programming interface (API) libraries 190 in some embodiments. The runtime environment 140 may run on top of lower-level software such as an operating system 192 in some embodiments. In embodiments where virtualized compute resources are being used as the execution platform, virtualization software such as a hypervisor may be used to configure the execution platform 102 for the operating system 192 (i.e., the operating system may run as an application on top of the hypervisor).

In different embodiments, the output or behavior produced as a result of the execution of the compiled code may include data stored in various levels of system memory (e.g., in-memory objects and/or data structures), on persistent storage (e.g., files on a file system), etc. The behavior may also include various program functionalities, such as displaying output on a screen, sending messages over a network, and/or otherwise interacting with various users and/or components.

For example, in some embodiments, executing the compiled code may include determining and/or detecting that one or more type assumptions made during compilation are invalid. In response to determining that a first type assumption is invalid, the compiled code may replace at least of portion of the compiled code with other, replacement, compiled code using a different (e.g., possibly less optimistic) type assumption and treating an element of the code as a different type.

For instance, in one embodiment, a first candidate compiled bytecode may have been generated by a compiler using a first type assumption and treating an element of the code as a first candidate type. In response to detecting that the first type assumption is invalid, the first candidate compiled bytecode may replace at least a portion of the first candidate compiled bytecode with a second candidate compiled bytecode using a second type assumption and treating the same element as a second candidate type.

Thus, in some embodiments, the compiled code itself may be configured to not only detect that a type assumption is invalid, but may also cause a second set of bytecode to be compiled using another type assumption and may execute that second compiled bytecode in order to continue executing using the other type assumption.

Byte Code Verification

Although a compiler, such as compiler 120, may ensure that source code doesn't violate any type safety rules, when an application imports a code fragment, it doesn't necessarily know if code fragments follow the language rules for safety: the code may not have been produced by a known-to-be trustworthy compiler. In such a case, the runtime system may utilize bytecode verification. A bytecode verifier, such as bytecode verifier 170, may traverse the bytecodes, construct the type state information, and verify the types of parameters for bytecode instructions, according to some embodiments.

FIG. 1 illustrates, according to one embodiment, the flow of data and control from language source code through the compiler, to the class loader and bytecode verifier and on to the virtual machine, which may contain the interpreter and runtime system. A class loader and bytecode verifier may not make assumptions about the primary source of the code stream. For example, the code may have come from the local system, or it may have originated on remote systems. Bytecode verifier 170 may act as a sort of gatekeeper in some embodiments. For instance, in one embodiment, bytecode verifier 170 may ensure that code is passed to the interpreter or JIT compiler in an executable state and that it may be executed without fear of breaking the interpreter or compiler. Imported code may not be allowed to execute until after it has passed the verifier's tests. Traditionally, once the verifier is done, a number of properties may be known:

There are no operand stack overflows or underflows

The types of the parameters of all bytecode instructions are known to always be correct Object field accesses are known to be legal—private, public, or protected Once the bytecode verifier has verified a set of code, the interpreter and/or JIT compiler can proceed under the assumption that the code will execute securely. Knowing these properties may make the interpreter faster, because it may not have to verify the code itself.

Scripting Languages

Scripting languages may be considered programming languages that support the ability to write scripts. Unlike source files for other programming languages that are compiled into bytecode before executed, scripts are evaluated by a runtime environment such as by a script engine, directly.

Most scripting languages are dynamically typed. In some embodiments, dynamic typing may enable the creation of new variables without declaring the variable type (e.g., the interpreter may assign the type based on the type of an object associated with the variable), and the same variable may be reused for objects of different types (i.e., type conversion may be performed automatically).

Although scripting languages may be interpreted at runtime, they can be compiled into bytecode that executed on a Virtual Machine. By embedding scripts within other compiled code, applications may be customized and/or extended. For example, configuration parameters, business logic, math expressions, and other external parts may be written as scripts, according to some embodiments.

Virtual Machine Support for Non-Native Languages

A virtual machine implementation (such as a Java Virtual Machine implementation as one example) may enable non-native languages to exploit the infrastructure and potential performance optimizations of the virtual machine. In some embodiments, one key mechanism may be the invokedynamic instruction, which may simplify the implementation of compilers and runtime systems for dynamically typed languages on the virtual machine.

Static and Dynamic Typing

A programming language may be considered statically typed if it performs type checking at compile time. Type checking may be considered the process of verifying that a program is type safe. For instance, a program may be determined to be type safe if the arguments of all of its operations are the correct type. For example, Java is a statically typed language.

In a statically typed language, all typed information for class and instance variables, method parameters, return values, and other variables may be available when a program is compiled. The compiler for the programming language may use this type information to produce strongly typed bytecode, which can then be efficiently executed by the virtual machine at runtime without having to perform runtime type checking.

Typically, a dynamically typed programming language may perform type checking at runtime. For instance, JavaScript and Ruby are examples of dynamically typed languages. Dynamically typed languages may verify at runtime, rather than at compile time, that values in an application conform to expected types. These languages may not have any type information available at compile time. The type of an object may only be determined at runtime. Thus, traditionally it was typically difficult to efficiently implement dynamically typed languages on a virtual machine.

A programming language that features strong typing typically specifies restrictions on the types of values supplied to its operations. If a computer language implements strong typing, it may prevent the execution of an operation if its arguments have the wrong type. Conversely, a language that features weak typing may (implicitly) convert (or cast) arguments of an operation if those arguments have wrong and/or incompatible types, according to some embodiments.

Statically typed programming languages may employ strong or weak typing. Similarly, dynamically typed languages may also apply strong or weak typing. For example, a programming language may be dynamically typed and strongly typed (e.g., the Ruby programming language is dynamically typed and strongly typed). Once a variable has been initialized with a value of some type, a programming language that is a dynamically typed and strongly typed may not implicitly convert the variable into another data type. For example, a programming language that is a dynamically typed and strongly typed may not allow the following:
a="40"
b=a+2

In the above example, the programming language may not cast the number 2, which may have a numeric type, to a string.

Compiling Dynamically Typed Languages

Consider the following dynamically typed example method, addtwo, that adds any two numbers (which may be of any numeric type) and returns the sum:
def addtwo(a, b)
   a+b;
end In a strongly typed language, whether typed statically or dynamically, the behavior of + (the addition operator) generally depends on the types of the operands. A compiler for a statically-typed language may choose which implementation of + is appropriate based on the static types of a and b. For example, a Java compiler may implement + with the iadd virtual machine instruction if the types of a and b are int. In contrast, a compiler for a dynamically-typed language may defer the choice until runtime. The statement a+b may be compiled as the method call +(a, b), where + is the method name. The runtime system for the dynamically-typed language may be able to identify that a and b are variables of an integer type. The runtime system may then call an implementation of + that is specialized for integer types rather than arbitrary object types, according to some embodiments.

Thus, a runtime system for compiled dynamically typed languages may have to choose the most appropriate implementation of a method or function—after the program has been compiled. One simple solution may be to treat all variables as object (avoiding type mismatch issues at runtime). However, treating all variables as objects (e.g., as being of type Object) may not be efficient.

The invokedynamic Instruction

In some embodiments, a particular instruction, such as the invokedynamic instruction, may be used to enable the runtime system to customize the linkage between a call site and a method implementation. The invokedynamic instruction may simplify and potentially improve implementations of compilers and runtime systems for dynamic languages on the virtual machine. The invokedynamic instruction may do this by allowing the language implementer to define custom linkage behavior.

Continuing the above example, the invokedynamic call site is the + operator. An invokedynamic call site may be linked to a method by means of a bootstrap method, which may be a method specified by the compiler for the dynamically-typed language that is called by the virtual machine to link the site. Assuming the compiler emitted an invokedynamic instruction that invokes +, and assuming that the runtime system knows about the method adder(Integer, Integer), the runtime can link the invokedynamic call site to the adder method as in the following example code:

IntegerOps.java

```
class IntegerOps {
    public static Integer adder(Integer x, Integer y) {
        return x + y;
    }
}
```

Example.java

```
import java.util.*;
import java.lang.invoke.*;
import static java.lang.invoke.MethodType.*;
import static java.lang.invoke.MethodHandles.*;
class Example {
    public static CallSite mybsm(
        MethodHandles.Lookup callerClass, String dynMethodName,
MethodType dynMethodType)
        throws Throwable {
        MethodHandle mh =
            callerClass.findStatic(
                Example.class,
                "IntegerOps.adder",
                MethodType.methodType(Integer.class, Integer.class,
Integer.class));
        if (!dynMethodType.equals(mh.type( ))) {
            mh = mh.asType(dynMethodType);
        }
        return new ConstantCallSite(mh);
    }
}
```

In the above example, the IntegerOps class may belong to the library that accompanies the dynamic language's runtime system. The method Example.mybsm may be a bootstrap method that links the invokedynamic call site to the adder method. The object callerClass may be a lookup object, which may be a factory for creating method handles.

Additionally, the method MethodHandles.Lookup.findStatic (called from the callerClass lookup object) may create a static method handle for the method adder.

As one Java based example according to one embodiment, the classes java.lang.invoke.MethodHandles and java.lang.invoke.MethodHandle may contain various methods that create method handles based on existing method handles. This example calls the method asType if the method type of the method handle mh does not match the method type specified by the parameter dynMethodType. This may enable the bootstrap method to link invokedynamic call sites to methods whose method types do not exactly match.

The ConstantCallSite instance returned by the bootstrap method may represent a call site to be associated with a distinct invokedynamic instruction. The target for a ConstantCallSite instance may be permanent and, in some embodiments, may never be changed. In this case there may be only one method, adder, which is a candidate for executing the call site. In some embodiments, this method does not have to be implemented in the same language as the rest of the code. Instead, if there were several such methods being available to the runtime system, each handling different argument types, the bootstrap method mybsm may dynamically select the correct method, such as based on the dynMethodType argument.

Each instance of an invokedynamic instruction may be called a dynamic call site. A dynamic call site may originally be in an unlinked state, which means that there is no method specified for the call site to invoke. As previously mentioned, a dynamic call site may be linked to a method by means of a bootstrap method. A dynamic call site's bootstrap method may be a method specified by the compiler for the dynamically-typed language that may be called by the virtual machine to link the site. In some embodiments, the object returned from the bootstrap method may permanently determine the call site's behavior.

Primitive Data Types

In a statically-typed programming language all variables would first be declared before they can be used. This involves stating the variable's type and name. A variable's data type determines the values it may contain, plus the operations that may be performed on it. For example, in addition to int, the Java programming language supports seven other primitive data types. A primitive type is pre-defined by the language and is named by a reserved keyword. Primitive values do not share state with other primitive values. As one example the eight primitive data types supported by the Java programming language are shown below:

byte: The byte data type is an 8-bit signed two's complement integer. It has a minimum value of −128 and a maximum value of 127 (inclusive).

short: The short data type is a 16-bit signed two's complement integer. It has a minimum value of −32,768 and a maximum value of 32,767 (inclusive).

int: By default, the int data type is a 32-bit signed two's complement integer, which has a minimum value of −231 and a maximum value of 231-1.

long: The long data type is a 64-bit two's complement integer. The signed long has a minimum value of −263 and a maximum value of 263-1.

float: The float data type is a single-precision 32-bit IEEE 754 floating point.

double: The double data type is a double-precision 64-bit IEEE 754 floating point.

boolean: The boolean data type has only two possible values: true and false.

char: The char data type is a single 16-bit Unicode character. It has a minimum value of '\u0000' (or 0) and a maximum value of '\uffff' (or 65,535 inclusive).

Figure 2:
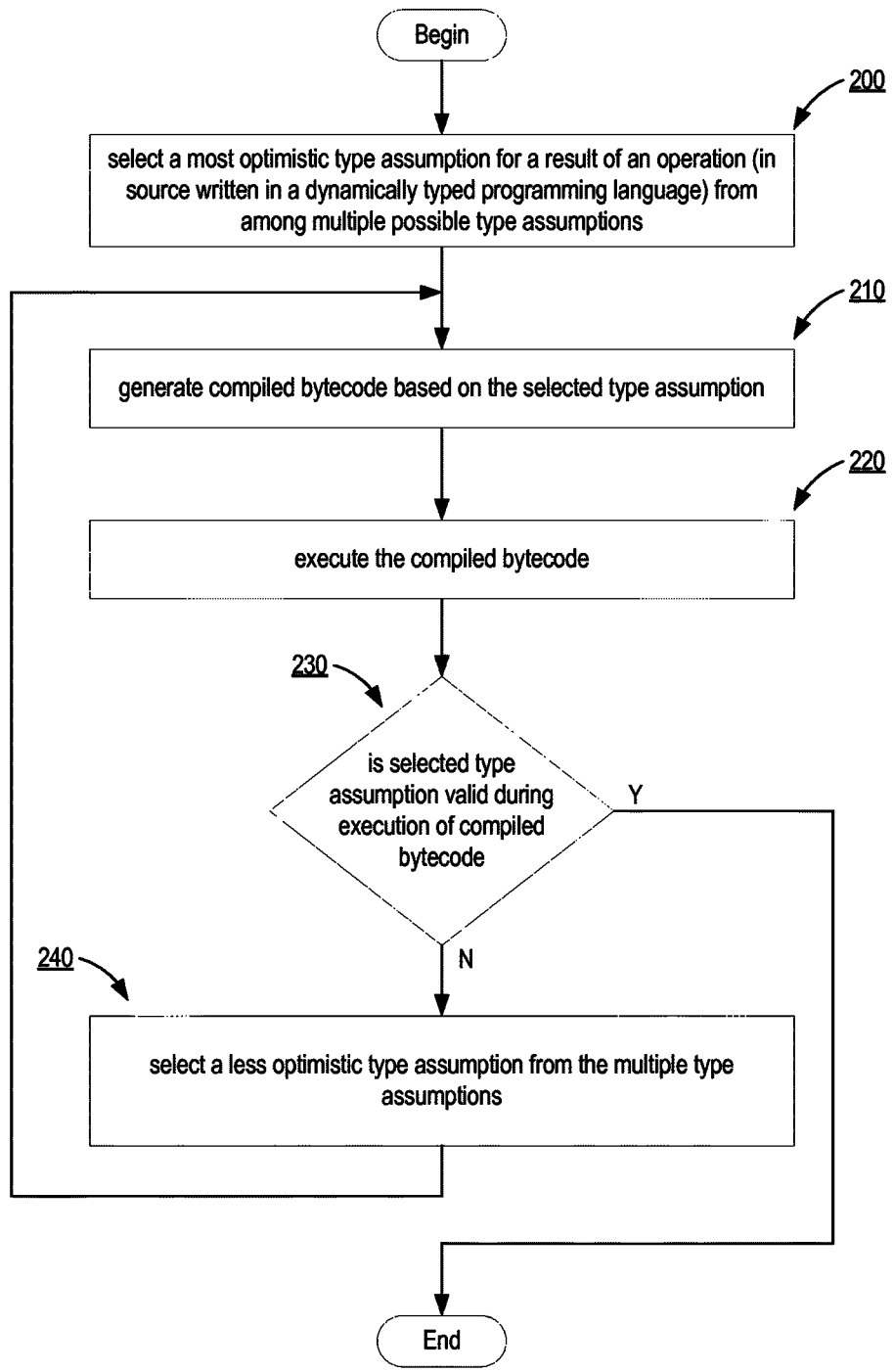
FIG. 2 is a flowchart illustrating one embodiments of a method for optimistically assuming types in a dynamically typed language.

FIG. 2 is a flowchart illustrating one embodiment of a method for implementing optimistic type assumptions. As shown in block 200, when implementing optimistic type assumptions, a most optimistic type assumption may be selected from among multiple possible type assumptions. In one embodiment, optimistically assuming types in a dynamically type language may involve a compiler parsing code and the compiler detecting an element of the code whose type is unspecified to the compiler. The element may have a type that is unspecified to the compiler, such as when the code is written in a dynamically (rather than statically) typed language (e.g., JavaScript, Perl, PHP, Ruby, etc.). The element may have an unspecified type that cannot be positively determined by a compiler or interpreter.

For instance, the type assumption may be selected for a particular result of an operation in source code written in a dynamically typed programming language, according to some embodiments. In other embodiments, the type assumption may be made regarding other programming elements, such as a local variable, array element, etc. For example, the element may result from an operation in the code, such as from an arithmetic operation, relational operation, conditional operation, logical operation, assignment operation, ternary operation, instanceof operation, etc.

Compiled bytecode (or other compiled code) may be generated based on the selected type assumption, as shown in block 210. For example, the compiler may generate compiled bytecode for execution by an execution engine or virtualized execution environment (e.g., a virtual machine) using the selected type assumption. The compiled bytecode may treat the element as a particular type according to the selected type assumption. For example, the selected type assumption may treat the element as primitive type (e.g., int) or other low-overhead type, in one embodiment.

The selected type assumption may be considered more (or the most) optimistic based on the performance cost of treating the element as the selected type. Numbers in dynamically typed languages may have no fixed ranges. Instead, in some embodiments, numbers may be considered to approximate a particular range. For example, a number be considered "int-ish" or "double-ish." When executing bytecode generated from a dynamically typed language, overflow conditions may occur if a number does not match the size of a typed variable used for that number. One conservative approach to handle overflow conditions may be to treat all numeric arithmetic using doubles. While double arithmetic may (generally) be slower than integer arithmetic, double arithmetic may, in some embodiments, be faster than integer arithmetic when performing overflow checks during integer arithmetic.

In other words, the cost of performing overflow checks and integer arithmetic may outweigh the cost of double arithmetic without performing overflow checks. Alternatively, all numbers may be represented with objects, such as to get the resulting bytecode format type agnostic. However, the performance cost of representing everything as objects may be too high to be viable for some implementations or embodiments. In order to improve bytecode performance when using a dynamically typed language, optimistic assumptions about types may be used in some embodiments, as will be described in more detail below.

Thus, the performance cost of treating the element as a double may be more than the relative performance cost of treating the element as an integer (e.g., without performing overflow check). Thus, a type assumption that treats the element as an integer may be considered more optimistic than a type assumption that treats the element as a double, according to some embodiments.

The compiled bytecode may be executed, as shown in block 220. For example, the compiled bytecode may be executed by an execution engine (e.g., a script engine) within a virtualized execution environment (e.g., a virtual machine). In other embodiments, however, the compiled bytecode may represent other types of compiled code that may execution in any of various manners within any of various types of execution environments.

In some embodiments, the compiled bytecode may execute without determining that the selected type assumption is invalid, as indicated by the positive output of decision block 230. For example, no overflow or other type mismatch condition may occur that invalidates the selected type assumption. Thus, the candidate code may execute using fewer resources, such as CPU cycles, memory, etc., than would have been used without making the selected type assumption or by making a less optimistic type assumption (e.g., using a higher-overhead type).

If, during execution of the compiled bytecode it is determined (or detected) that the selected type assumption is not valid, as indicated by the negative output of decision block 230, a less optimistic type assumption may be selected from the possible type assumptions, as shown by block 240. For example, a type mismatch, overflow or other condition may be detected when executing an operation involving the element, thus indicating that the selected type assumption in invalid for the element and the compiled bytecode.

In response to detecting that the selected type assumption in invalid, a less optimistic type assumption may be selected from the possible type assumptions, as shown in block 240. For example, the new type assumption may be selected from the other possible type assumptions as being expected to have the next lowest performance cost. In other words, if the most optimistic type assumption is proven to be invalid, a next optimistic type assumption (e.g., one that is less optimistic than the first, most optimistic, type assumption) may be used. For example, if a type assumption that treats the element as an integer proves to be invalid, a second type assumption that treats the element as a long or a double may then be selected and used.

After selecting a less optimistic type assumption, new compiled bytecode may be generated based on the newly selected type assumption, as indicated by the arrow from block 240 looping back to block 210. For instance, at least a portion of the first compiled bytecode may be replaced with different compiled code that treats the element according to the currently selected type assumption. In some embodiments, it may not be possible to just replace the code of the executing function code with different code having different type assumptions. In some embodiments, the executing function code may be regenerated (e.g., modified and recompiled) such that execution is resumed at the point where the execution was suspended (e.g., at a point indicated by an exception regarding an invalid type assumption).

Some embodiments may involve the use of a limited form of continuations. For example, the regeneration and restarting of execution resulting from an invalid type assumption may only involve the restarting of a single method (e.g., without needing deeper stacks) and the method may only have to be restarted once, according to some embodiments.

This process may be repeated multiple types, using a less optimistic type assumption each time, according to some embodiments. Thus, if the second type assumption is determined to be invalid, a third type assumption may be selected and used. In some embodiments, additional type assumptions may be selected and used as current type assumptions are proved invalid until the compiled code executes without the current type assumption proven to be invalid. In other embodiments, however, whenever the initial (optimistic) type assumption is proven to be invalid, a least optimistic type assumption (e.g., a type assumption that is guaranteed to be valid) may be selected, even at the risk of increased performance cost.

Thus, as described above regarding FIG. 2, (e.g., such as JavaScript in one example embodiment), optimistic type assumptions may be made in a dynamically typed language by a compiler (or interpreter) for statically unprovable types. In some embodiments, a compiler (or interpreter) may make assumptions that use as narrow (e.g., optimistic) a type as possible. In response to determining that an initial type assumption is invalid (e.g., when an overflow condition or other type mismatch occurs), a wider (e.g., less optimistic) type assumption may then be made and the code regenerated (and/or replaced) and execution continued. In some embodiments, execution may be restarted in such a manner as to begin execution at the point at which the type assumption was determined to be invalid. This process may be repeated using wider and wider (e.g., less and less optimistic) type assumptions until the code executes without determining that the assumption is invalid, according to some embodiments.

Figure 3:
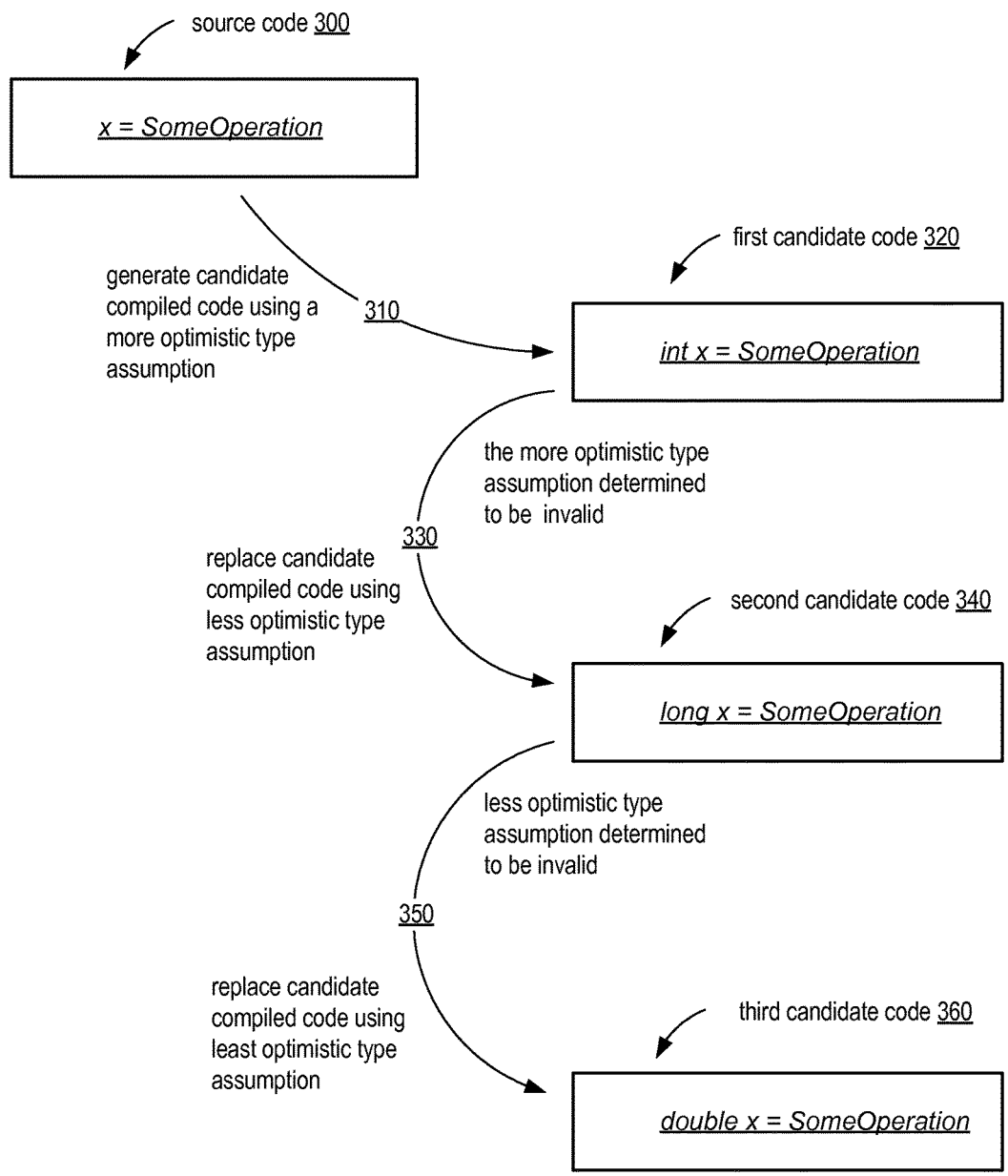
FIG. 3 is a logical block diagram that illustrates the use of multiple optimistic type assumptions, according to one embodiment.

FIG. 3 is a logical block diagram that illustrates the use of multiple optimistic type assumptions, according to one embodiment. As illustrated by FIG. 3, source code in a dynamically typed language may include a statement for which the type of an element is undetermined. For example, source code 300 may include an element x for which a compiler (or interpreter) cannot positively determine a type. Thus, as noted above, the compiler may generate candidate compiled code, such as first candidate code 320, using a more optimistic (e.g., or the most optimistic) type assumption, as shown by arrow 310. For example, compiler 120 may generate first candidate code 320 using a first type assumption that treats the element x as an integer. As noted above, a type hierarchy (such as: int→long→double→object) may be used for type assumptions in some embodiments. Narrow (e.g., more optimistic) type assumptions (e.g., as narrow as possible and/or as narrow as practical) may be made for unknown (e.g., statically unprovable) types. The first candidate type may, in some embodiments, be selected as being expected to have a lower (or the lowest) performance cost (e.g., exhibit the highest performance) of the multiple types. For example, an integer type may be selected over a long type and a long type may be selected over a double type.

If during execution of the first candidate code 320, it is determined that the more optimistic type assumption (e.g., integer) is invalid and the first candidate code may be replaced with candidate code compiled using a less optimistic type assumption, as illustrated by arrow 330 in one embodiment. For example, in one embodiment, the candidate code treating the element x as an integer may be replaced with second candidate code 340 using a less optimistic type assumption that treats the element x as a long. Execution may then be restarted, as described above.

If, during the execution of the second candidate code 340, the less optimistic type assumption is determined to be invalid, the second candidate code may be replaced with candidate code compiled using a least optimistic type assumption, as shown by arrow 350, according to one embodiment. For example, second candidate code 340 may be replaced with third candidate code 360 using a third type assumption that treats the element x as a double.

As discussed above, in some embodiments, when replacing first candidate compiled code with second candidate compiled code in response to determining that first type assumption is invalid, various mechanisms may be utilized to ensure proper continuation of execution. For instance, in some embodiments, use of optimistic type assumptions may involve preserving the on-stack values of a bytecode method while throwing an exception for on-stack code replacement by introducing artificial store/load pairs that ensure the stack values are present in temporary (e.g., local) variables (as the stack may be cleared by an exception throw).

Figure 4:
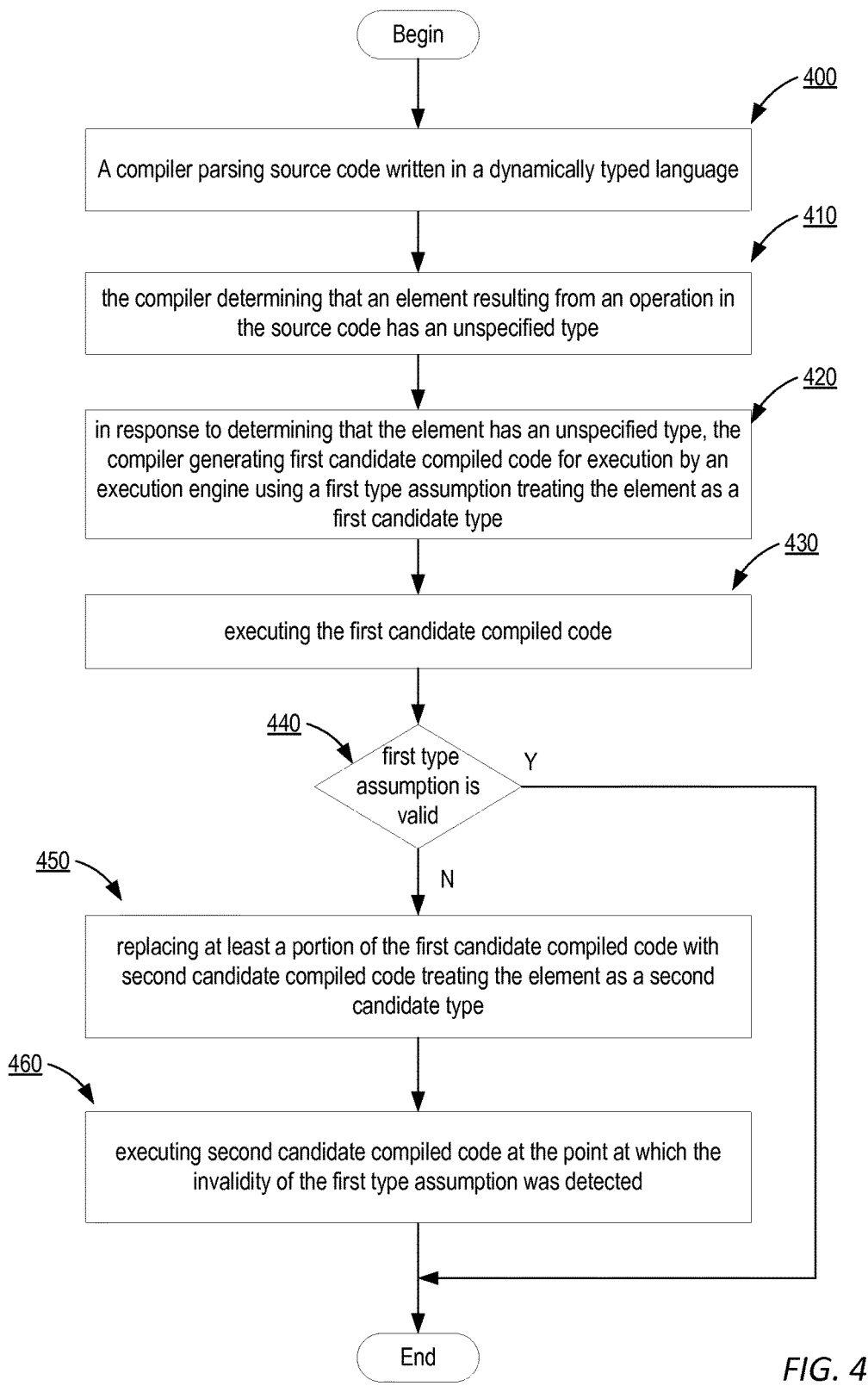
FIG. 4 is a flowchart illustrating one embodiment of a method for optimistically assuming types in a dynamically typed language.

As noted above, in some embodiments, types may be optimistically assumed (e.g., at compile time) in a dynamically typed language and may be modified during runtime if a type assumption proves invalid. FIG. 4 is a flowchart illustrating one embodiments of a method for optimistically assuming types in a dynamically typed language.

As shown in block 400, a compiler, such as compiler 120, may be parse source code written in a dynamically typed language (e.g., such as JavaScript, Perl, PHP, Ruby, etc.) and may determine (or detect) that an element resulting from an operation in the source code has an unspecified type, as shown in block 410. For example, compiler 120 may be parsing (as part of compiling) source code in a dynamically typed language and may determine that a particular element resulting from an operation (such as an arithmetic operation, relational operation, logical operation, assignment operation, conditional (ternary) operation, instanceof operation, etc.), has a type that is unspecified to (and/or cannot be positively determined by) the compiler 120.

As shown in block 420, the compiler may, in response to determining that the element has an unspecified type, generate first candidate compiled code (e.g., bytecode) for execution using a first type assumption that treats the element as a first candidate type, according to one embodiment. For instance, in one embodiment, a first candidate type may be selected (e.g., based on a first type assumption) from multiple possible types. For instance, in some embodiments, a type hierarchy (such as: int→long→double→object) may be used for type assumptions. Narrow type assumptions (e.g., as narrow as possible and/or as narrow as practical) may be made for unknown (e.g., statically unprovable) types. The first candidate type may, in some embodiments, be selected as being expected to have a lower (or the lowest) performance cost (e.g., exhibit the highest performance) of the multiple types. Thus, the compiler may generate the first candidate compiled code using a first type assumption that treats the element as a first candidate type, such as a primitive type (e.g., int) or other low-overhead type.

For example, an integer type may be selected over a double type because the integer type may be expected to have a lower performance code that the double. Thus, in some embodiments, integer addition may be used even when the compiler can't statically prove that ints are being used, by assuming that ints are being used. If that assumption is incorrect, an exception/continuation passing mechanism that generates a new method with wider types for the erroneous assumption may be built and control may be passed to an equivalent program point in a new version of the method, according to some embodiments.

In some embodiments, the first candidate compiled code may execute without detecting that the first type assumption is invalid. In other words, no overflow or other type mismatch related condition may occur that invalidates the first type assumption. Thus, the candidate code may execute using fewer resources, such as CPU cycles, memory, etc., than would have been used without making the first type assumption or by making a less optimistic type assumption (e.g., using a higher-overhead type).

Alternatively, during execution of the first candidate compiled code, as shown in block 430, it may be determined that the first type assumption is not valid, as shown by the negative output of decision block 440. For instance, during execution of the first candidate compiled code an overflow condition or other type mismatch may occur (e.g., an exception may be thrown) and thus it may be detected that the first type assumption is invalid for the first candidate compiled code. For example, in one embodiment, after selecting an integer type as a first type assumption, it may be determined that the integer type assumption is invalid, such as due to an overflow condition occurring when executing an arithmetic operation.

In response to determining that the first type assumption is invalid, at least a portion of the first candidate compiled code may be replaced with second candidate compiled code treating the element as a second candidate type, as shown in block 450. For example, in one embodiment (at least a portion of) the source code for the first candidate compiled code may be modified to use a second type assumption and treat the element as the second candidate type. The modified source code may then be recompiled to generate the second candidate compiled code. When modifying source code to generate the second candidate compiled code, the original version of the source code may not be changed. Instead, a temporary version of the source may be changed (e.g., possibly only in memory) and used to generate the second candidate compiled code.

In other embodiments however, the compiled bytecode for the first candidate compiled code may be directly modified to generate the second candidate compile code. For instance, the compiler may include information indicating different types associated with different expressions. Thus, the association of types with expressions may be maintained in the source code allowing modification of the compiled bytecode to support different types (e.g., according to different type assumptions) for different expressions, according to some embodiments. When a first type assumption is proven invalid for a particular expression, the first candidate compiled code may modify the type used for the expression according to a second type assumption and selecting the second candidate type from an association of types for the particular expression, as in one embodiment.

In some embodiments, one or more methods that use the element (for which the type assumption was determined to be invalid) may be replaced with alternate versions that use a second (e.g., less optimistic) type assumption and that treat the element as a second candidate type. For example, after determining that an integer type assumption is invalid for a particular element, the methods using the element may be modified and recompiled (e.g., during the same runtime for which the type assumption was determined to be invalid) treating the element as a long (or double, or float) instead of an integer. The newly compiled versions (e.g., the modified versions) of the methods may then be loaded (and/or linked) so that any future executions of the methods utilized the new type assumption.

As shown in block 460, the second candidate compiled code may be executed at the point at which the invalidity of the first type assumption was detected, according to some embodiments. For example, the second candidate compiled code may be executed such that execution continues from an execution point in the second candidate compiled code that matches an execution point in the first candidate compiled code at which the invalidity of the first type assumption was detected. Thus, execution may be restarted in such a manner as to begin execution at the point at which the type assumption was determined to be invalid without repeating the execution of any code already executed (e.g., without repeating the execution of the operation that caused the invalidity of the first type assumption to be determined).

In some embodiments, additional steps may be taken in order to ensure that execution in restarted without loss of information and/or without having to repeat the execution of any previously executed code. For example, in one embodiment, any result (or result value) generated by executing the operation that caused the first type assumption to be proven invalid may be preserved and used when execution in restarted. In addition, executing the second candidate compiled code may include configuring an execution state for the second candidate compiled code based on an execution state of the first candidate compiled code at the execution point at which the invalidity of the first type assumption was detected. For example, in one embodiment, an execution state may include a result (e.g., a result value) of the operation that caused the invalidity of the first type assumption to detected, one or more stack values, and/or a restart point identifier (ID) indicating the point at which the type assumption was determined to be invalid.

Furthermore, a system for continuation handling and stack replacement of generated bytecode may be used when an assumption is proven incorrect or invalid. For instance, in some embodiments, the remainder of the executing method may not be executed, and instead, it may be replaced with a new, less optimistic, version of the currently executing method. For example, in some embodiments, bytecode may be invalidated "on the fly" with invokedynamic.

In some embodiments, the first candidate compiled code may itself replace at least a portion of first candidate compiled code and may also execute the second candidate compiled code. In other embodiments, however, other or different components of an execution engine may be configured to replace portions of the first candidate code and to restart execution.

Additionally, the features and/or mechanisms described above regarding FIG. 4, may be performed multiple times in order to try multiple type assumptions until a type assumption is shown to be valid (e.g., by having the code execute without determining that the type assumption is invalid). Thus, if the second type assumption is determined to be invalid for the second candidate compiled code, a third type assumption may be made and third candidate compiled code may be generated and used. In other embodiments, however, in response to determining that the first candidate type assumption is invalid a second candidate type may be selected which is guaranteed to succeed at the cost of increased performance. For instance, rather than possibly repeat the type assumption process multiple types, in some embodiments, in response to determining the most optimistic type assumption (e.g., int) is invalid, a non-optimistic type assumption (e.g., double or object) may be used.

Please note that while FIG. 4 is described above in terms of compiler 120, in some embodiments, the same actions, functions and/or steps described above as being performing by compiler 120 may also be performed by an interpreter. Additionally, while optimistic type assumptions are described above regarding FIG. 4 in terms of having two exceptions, one resulting from the invalid type assumption and another thrown by the exception handler catching the first, in some embodiments, zero, one, or multiple exceptions and exception handlers may be used in conjunction with optimistic type assumptions and deoptimizing recompilation, as described herein.

Figure 5:
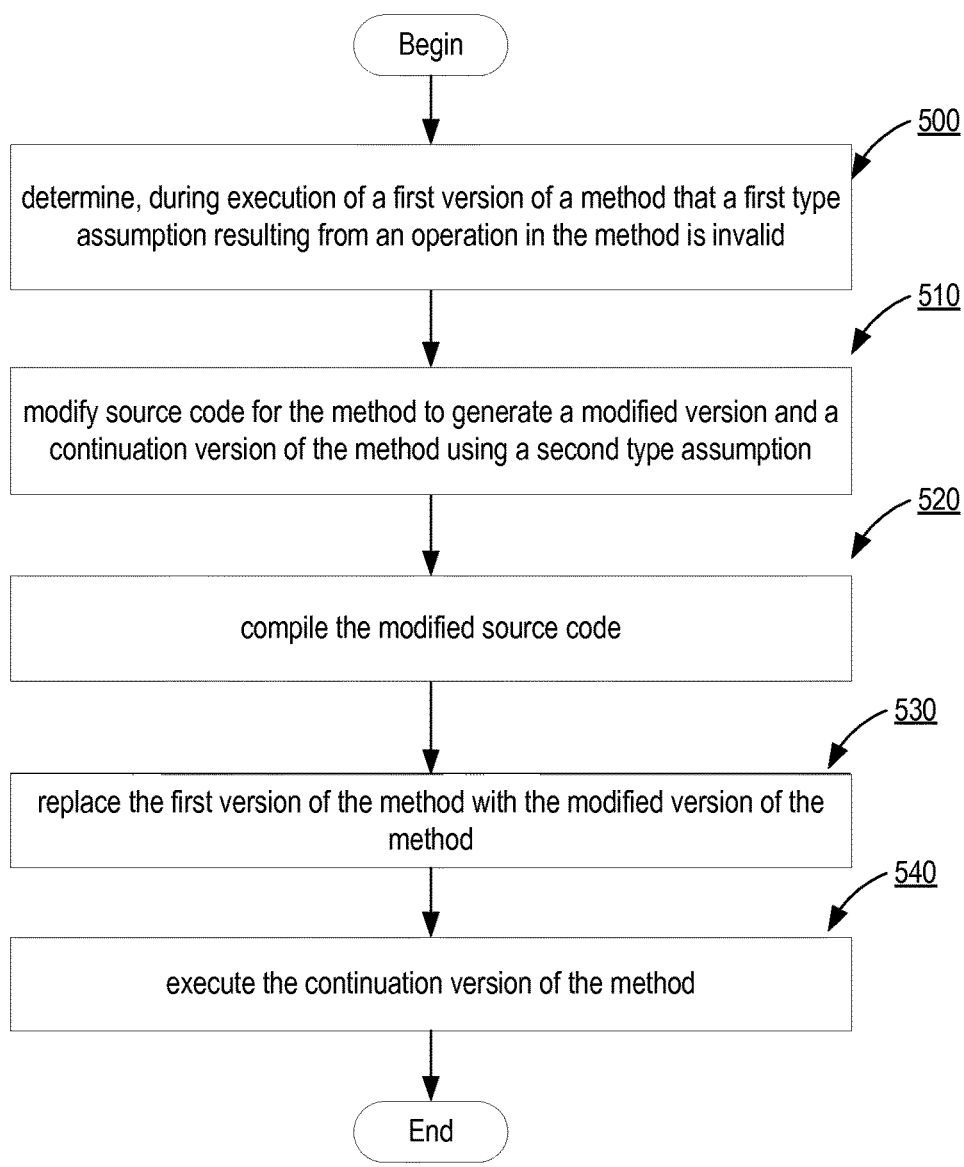
FIG. 5 is a flowchart illustrating one embodiment of a method for replacing and executing code to use a different type assumption.

FIG. 5 is a flowchart illustrating one embodiment of a method for replacing first candidate compiled code with second candidate compiled code and executing the second candidate compiled in order to use a different type assumption. As described above regarding FIG. 4, a portion of the first candidate compiled code may be replaced with second candidate compiled code treating the element as a second candidate type in response to determining that the first type assumption is invalid. Thus, as illustrated in block 500, it may be determined during execution of a first version of a method that a first type assumption resulting from an operation in the method is invalid. For example, a method of first candidate compiled code 320 may include a method including an element which the compiler treated as a first candidate type when generating the first candidate compiled code. Subsequently, during execution of the first candidate compiled code, it may be determined that the first assumption was invalid, as described above. In response, the first candidate compiled code may modify source code for the method to generate a modified version and a continuation version of the method using a second type assumption, as shown in block 510 and according to some embodiments. For example, a less optimistic type assumption may be selected and used when modifying the source code for the method. The modified source code may be compiled, as shown in block 520. The modified source code may be compiled in any of various manners, according to different embodiments. For example, in one embodiment, the first candidate compiled code may be configured to modify the source code and then direct (or initiate) the compilation of the modified source code. In one embodiment, a separate compiler, such as a run-time JIT compiler, may be utilized to compile the modified source code. In other embodiments, an interpreter (e.g., a script language interpreter) may be used to compile the modified source code.

After the modified source code is compiled, the first version of the method may be replaced with the modified version of the method, as shown in block 530. For example, in one embodiment, the first candidate compiled code may be relinked in order to replace the first version of the method (e.g., the version of the method using the first type assumption) with the modified version (e.g., the version using the second type assumption). Thus, whenever that same method is subsequently executed (e.g., during the same overall execution run), the modified version of the method may be execution instead of the first version.

In other embodiments, the second candidate compiled code may be generated by modifying the first candidate compiled code without modifying the underlying source code. Instead, in some embodiments, the portion of the first candidate compiled code that includes the expression for which the type assumption was proven invalid may be modified to use a different type (e.g., according to a different type assumption) to generate the second candidate compiled code.

Additionally, as will be discussed in more detail below, the continuation version of the method may be executed, as shown in block 540. In some embodiments, in order to execute the remainder of the currently executing method, a separate continuation method may be generated to perform the operations that would be performed by the remainder of the currently executing method. After a method is regenerated with a less optimistic assumption at one of its call sites, the computation may need to be resumed in that method. However, the newly generated method may not be called at this point, since it could fail another optimistic assumption. Instead, in some embodiments, only one optimistic call site may be changed per recompilation and a special continuation version of the method may be invoked instead.

The continuation version of the method may not take any parameters of the original method. Instead the continuation version of the method may only take a single parameter, such as one of type RewriteException, according to one embodiment. Its bytecode may be similar to the bytecode of the original method. However, it may contain a special prologue that may restore the values of local variables from the exception (e.g., local variables associated with execution of the first candidate compiled code), reconstruct the operand stack corresponding to the program restart point ID (also stored in the exception), and jump to the instruction corresponding to the program restart point ID, according to one embodiment.

In some embodiments, the construction of MethodHandles.catchExceptions and pessimistic continuation methods may allow a new version of the currently executing method to be generated whenever an optimistic type assumption is invalidated. The new version of the method may be generated with that one type assumption (i.e., the type assumption that caused the exception) replaced with a more pessimistic one, and the rest of the method's execution handled by the continuation method. In some embodiments, if the method has several optimistic type assumptions that are not valid, they may be invalidated one by one on each invocation of the method.

Optimistic type assumptions may involve a bytecode compilation technique involving once-restartable, single-frame deep continuations in a script engine without utilize external support for continuations (e.g., without utilizing continuation support from a virtual machine or other virtualized runtime environment), according to some embodiments. In some embodiments, one or more exceptions, and their corresponding exception handlers, may be utilized to replace invalid type assumptions with other, less optimistic type assumptions.

Figure 6:
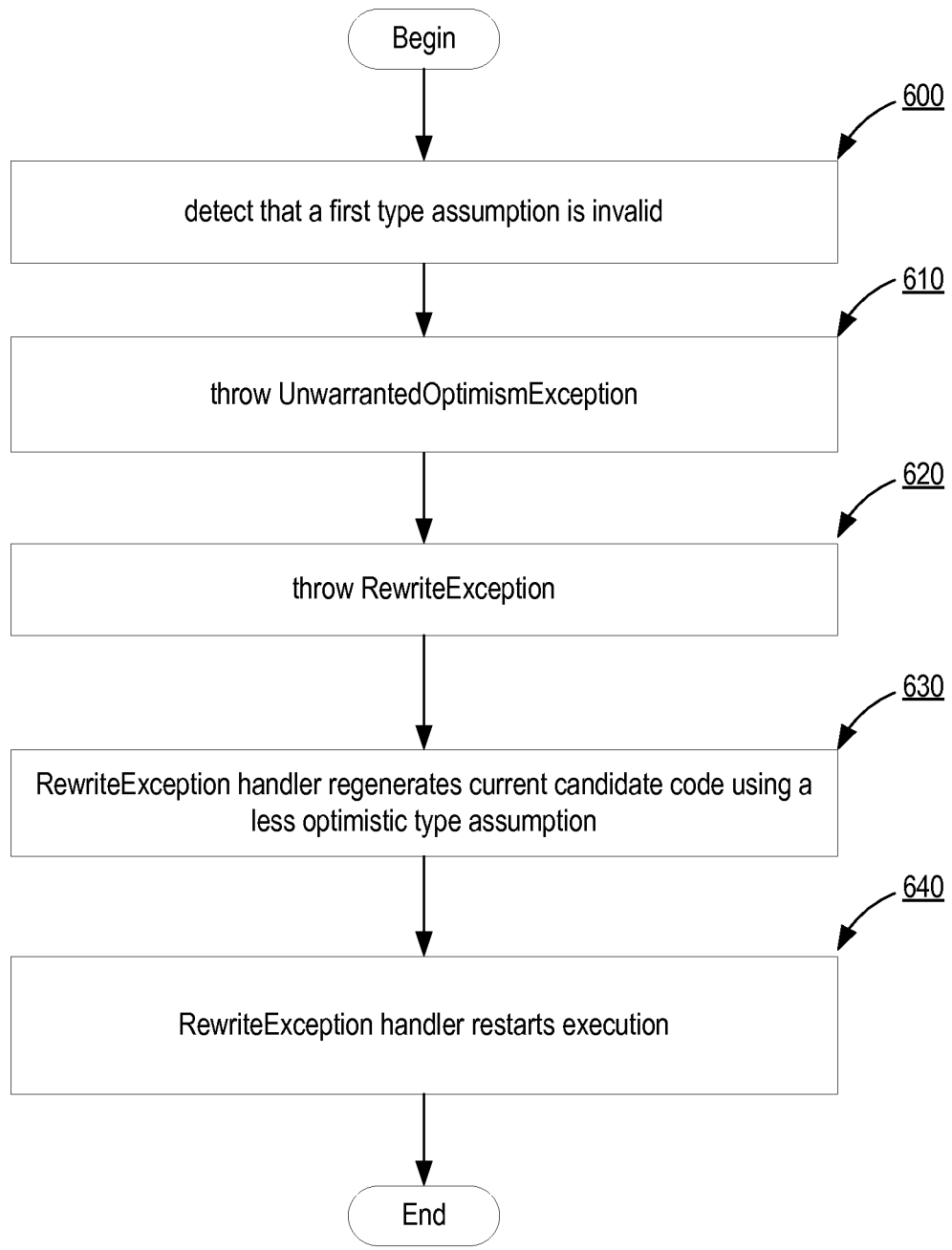
FIG. 6 is a flowchart illustrating one embodiment of a method for replacing invalid type assumptions and continuing execution as part of optimistic type assumptions.

FIG. 6 is a flowchart illustrating one embodiment of a method for implementing optimistic type assumptions using once-restartable, single-frame deep continuations. As shown in blocks 600 and 610, after detecting that a first type assumption is invalid, an UnwarrantedOptimismException may be thrown, according to one embodiment. In some embodiments, such as when an INVOKEDYNAMIC call site in an execution engine (e.g., a script engine) has a primitive return type, the engine's linker may insert a transformation (e.g., a filterReturnValue transformation) that may coerce the returned value into an expected type if the target method doesn't already return the expected type. For optimistically typed call sites, however, automatic coercion may not be used. Instead, a call particular site flag may be used to signal that an exception should be thrown if the return value (or result value) is not of the expected type. For example, in one embodiment, a CallSiteDescriptor.CALLSITE_OPTIMISTICALLY_TYPED site flag may be used to signal the linker insert a filterReturnValue that throws an exception if the return value (or result value) is not of the type expected by an optimistic type assumption for the call site.

In some embodiments, this exception may be referred to as an UnwarrantedOptimismException, as will be described in more detail below. A method in the executing code that contains at least one rewritable call site (e.g., a call site utilizing an optimistic type assumption) may need to have a try/catch block for UnwarrantedOptimismException, according to some embodiments. When the exception is caught, a new exception, such as a RewriteException, may be prepared. According to some embodiments, when an UnwarrantedOptimismException is thrown, the dynamically invoked method completed successfully but the return value type does not match what was expected based on the optimistic type assumption. Please note that while described herein using an UnwarrantedOptimismException, in other embodiments, exceptions of different types, differently named exceptions, and possibly no exceptions at all, may be utilized when implementing optimistic type assumptions. In some embodiments, the UnwarrantedOptimismException may be local to the method containing the optimistic call site and may never be rethrown.

Additionally, a second exception, such as a RewriteException, may be thrown, as shown in block 620. In some embodiments, an UnwarrantedOptimismException handler may throw the RewriteException. A RewriteException may be handled (e.g., caught) by a RewriteException handler. The RewriteException exception handler may be responsible for performing the replacement of the candidate compiled code and for restarting execution, according to some embodiments. Thus, the RewriteException handler may then regenerate the candidate code using a less optimistic type assumption, as shown in block 630. As described above, in response to determining that an optimistic type assumption is invalid, an exception/continuation passing mechanism may generate a new method with wider types for the erroneous assumption and control may be passed to an equivalent program point in a new version of the method, according to some embodiments.

The process of generating new versions of candidate code using a less optimistic type assumption may be referred to as deoptimizing recompilation. During deoptimizing recompilation, two versions of the currently executing method may be compiled: a deoptimized version, and a one-shot continuation version. The deoptimized version of the method may be used for any subsequent executions of the method while the one-shot continuation method may be used to complete the current execution of that method.

In some embodiments, optimistic type assumptions may involve a method for calculating the minimal (in terms of code size) set of cascading exception handlers that can gather values of local variables for a continuation. In some embodiments, one handler may be needed for every point in the code that can throw a continuation-generating exception. In other embodiments, however, one handler may be needed for every type-shape of local variable table occurring in the method. In yet other embodiments, a handler may only need to fill out a unique suffix of the local variable table type-shape it handles, and may delegate the filling out of a prefix to another handler that might exist in its own right, or as a common prefix of two or more handlers. Thus, a minimal hierarchy of cascading exception handlers may be created for handling all possible local variable table shapes at continuation points in the method, according to some embodiments.

In some embodiments, the linker may be able to determine if it is linking a rewritable method (e.g., one that contains at least one optimistically-typed call site). For instance, in one embodiment this information may reside in either ScriptFunctionData or a throws RewriteException declaration may be added to the method. When the linker links a rewritable method, it may need to do so with a MethodHandles.catchException combinator for RewriteException. The catch method of this combinator may trigger the recompilation of the method, with the single call site that failed its optimistic type assumption changed to a less optimistic type, according to some embodiments. The recompiled function may then be relinked into the call site. Finally, a special continuation version of the method may be invoked, passing it the RewriteException as its only argument, in some embodiments.

Using two exception classes (e.g., UnwarrantedOptimismException and RewriteException) instead of just one may allow a single call site to produce either a RewriteException (e.g., if its target is a rewritable method) or an UnwarrantedOptimismException (e.g., if it is itself optimistically typed). In the first case, its target may need to be regenerated and restarted. In the second case, the method containing the call site may need to be regenerated and restarted.

Note that, in some embodiments, the rewrite and restart may be completely handled by the linker-produced combined method handle and therefore the bytecode of the caller may be considered agnostic of the fact that some of its callees might be rewritable.

The RewriteException handler may then restart execution, as shown in block 640. For instance, execution may be resumed at the point where the invalidity of the first type assumption was detected, as described above. After a method is regenerated with a less optimistic assumption at one of its call sites, the computation may need to be resumed in that method. However, the newly generated method may not be called at this point, since it could fail another optimistic assumption, essentially requiring our method handle combinator to loop in a try/catch block until it once successfully executes (with a valid type assumption). Instead, in some embodiments, only one optimistic call site may be changed per recompilation and a special continuation version of the method may be invoked instead.

The continuation version of the method may not take any parameters of the original method, it instead may only have a single parameter, such as of type RewriteException. Its bytecode may be similar to the bytecode of the original method. In some embodiments, the continuation version of the method may not contain any optimistically typed call sites, thus preventing the continuation version from throwing a RewriteException. For instance, when a first type assumption is proven invalid, the first candidate compiled bytecode may be modified to use a reference (e.g., or object) type in order to guarantee that the continuation version will complete without the new type assumption proving invalid. However there could be other, different, type assumptions in the remainder of the method (and thus in the continuation version of the method) that may be proven invalid during execution of the continuation version of the method).

Thus, the continuation version may include optimistically typed call sites, each possibly throwing a RewriteException which would trigger another deoptimizing recompilation from within itself and thus causing execution to resume in yet another continuation version. A complete execution of a method (e.g., that includes an invalid optimistic assumption) may include performing several deoptimizations and continuations (and execution restarts/resumes) until the method completes, according to some embodiments.

Allowing continuation versions to throw RewriteExceptions (e.g., allowing continuation versions to include invalidatable optimistic type assumptions) may potentially improve execution speed and may also allow data use within the continuation to be narrowly typed, possibly preventing globally visible data structures (e.g., objects, arrays, etc.) from being polluted with unnecessarily wide data types.

Figure 7:
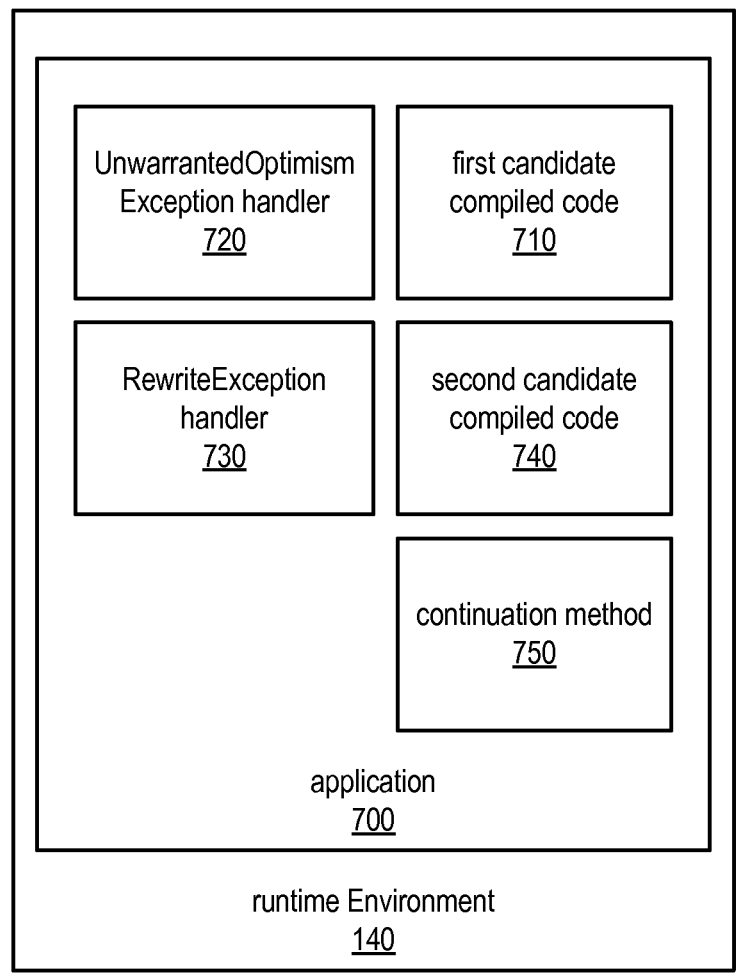
FIG. 7 is a logical block diagram illustrating various components of optimistic type assumption in a dynamically typed language, according to one embodiment.

FIG. 7 is a logical block diagram illustrating various components of optimistically assuming types in a dynamically typed language, according to one embodiment. As noted above regarding FIG. 6, in some embodiments, the code of the executing application may determine that a type assumption is invalid and may also generate another version of at least a portion of the bytecode and replace at least a portion of the currently executing code with the newly generated bytecode in order to use a different type assumption.

Thus, as shown in FIG. 7, application 700 executing within runtime environment 140, may include first candidate compiled code 710. As noted above, when compiling source code, such as source code 110, compiler 120 may generate first candidate compiled code 710 as part of application 700. In some embodiments, application 700 and first candidate compiled code may be implemented using a dynamically typed language and may represent compiled bytecode. As described above, if during execution of first candidate compiled code 710, it is detected that a type assumption is invalid, an exception, such as UnwarrantedOptimismException or other type mismatch related exception, may be thrown. An exception handler within application 700, such as UnwarrantedOptimismException handler 720 may catch the thrown exception and may in turn throw a RewriteException exception after possible gathering and/or saving information and/or data regarding the state of any currently executing methods and/or operations.

Another exception handler, such as RewriteException handler 730 may be executed and may catch the thrown RewriteException exception, according to one embodiment. RewriteException handler 730 may generate second candidate compiled code 740 as well as continuation method 750 in order to restart execution using a different type assumption, as described herein. While illustrated as part of application 700 separate from first candidate compiled code 710, in some embodiments, overflow UnwarrantedOptimismException handler 720 and RewriteException handler 730 may be part of first candidate compiled code. In general, the boxes used to illustrated the various components of application 700 represent just one example embodiment and in other embodiments, the same features and/or operations may be grouped into different, fewer or additional code components of application 700.

Representing Scoped Variables

Scoped variables in a dynamic language that is running on top of a virtual machine may be represented in any of various manners, according to different embodiments. For example, scoped variables are frequently stored either as primitive longs or as objects. However, storing scoped variables as objects may use additional memory (e.g., up to twice the amount of memory in some embodiments). This may eliminate significant boxing overhead for scope loads and stores.

When a variable's type changes, this may count as a PropertyMap (object shape) change for the object (e.g., when using the JavaScript programming language), thus possibly ensuring that standard mechanisms already in place work correctly in conjunction with the storage of scoped variables. For example, in one embodiment, changing a type on a property in an immutable property map may create a new property map. If a type is changed, the invalidation may also write the new representation of the scoped variable to the correct field. For example, ints may be represented as longs, longs as themselves, doubles as their raw bits in the primitive long and objects as references in the object field.

Warmup Optimization

In some embodiments, optimistically assuming types in a dynamically typed language may involve increasing the speed of warmup (e.g., reducing the length of warmup), such as in environments that utilize frequent recompilation. As used herein, the term warmup may refer to a virtual machine recompiling parts of an application's code to improve performance during an initial period after the application is launched.

As described above, in some embodiments, optimistically assuming types may involve working through a successive of type assumptions from more optimistic to less optimistic. However, repeatedly regenerating (e.g., recompiling and restarting executing using a different type assumption) methods may reduce performance. Thus, to avoid excessively (e.g., repeatedly) regenerating a method that involves erroneously type assumption loads, all other loads may be tagged (e.g., conservatively) as non-optimistic on method regeneration, thus possibly reducing the number of recompilations, according to some embodiments. In other words, whenever a first type assumption is detected as invalid, during regeneration for the first type assumption, other type assumptions for elements of the same method may also be changed to less optimistic type assumptions, which may involve very little extra loss of performance in some embodiments. Thus, once the performance hit must be taken in order to change an invalid type assumption, it may be better in terms of performance to change all related type assumptions (e.g., type assumptions for elements of the same method) to a less optimistic type that is more likely (or that is guaranteed) to execute without issue.

For example, given the following example code:

```
function( ) {
var tmp = a.x * a.x + a.y * a.y;
return tmp + a.x;
}
```

If a.x and a.y aren't integers, two type assumption invalidations may be saved instead of performing four type assumption invalidations. This may also be extended so that any operation that a.x is part of (e.g. tmp+a.x in the example) and that is dominated by the original type assumption invalidation, may also be regenerated with a wider (e.g., less optimistic type assumption).

When generating compiled code for a method to use a different type assumption, the method may be recompiled with a copy of the runtime scope, so that various field values (e.g., the values of loaded fields) may be known at recompile time, thereby possibly resulting in fewer additional type assumption invalidations (e.g., by looking at the value type of the field in the runtime scope), according to some embodiments.

Generic IR/Runtime Library for Any Dynamic Language on the JVM

In some embodiments, it may be beneficial use a dynamic language library for a dynamic language on a virtual machine, such the Java Virtual Machine. In some embodiments, a pluggable frontend/parser may generate code using an optimistic typing framework.

SwitchPoint-Based Determination of Overridden Builtins

SwitchPoints may be used to determine whether builtins have been overridden in a dynamic language implementation on top of the virtual machine, in some embodiments. The use of SwitchPoints to determine if builtins have been overridden may enable fast implementation of certain functions, such as Math.sin/cos, eval, apply, call, etc. While a guard—especially in the call/apply case, may involve up to 25% of the runtime for the fast operation (which may represent a worst case), the SwitchPoint may be a cost-free operation until invalidation takes place (regardless of how it is written, in some cases). For instance, the setter that invalidate the SwitchPoint may also replace itself, thereby possibly incurring no more invalidation overhead (e.g., if it has been executed once).

Not all guards may suffer from this performance overhead, but given the dynamic nature of scripting languages (e.g., JavaScript) and the possibility of overwriting builtins (e.g., which is infrequently done), some embodiments may attempt to reduce the number of guards (e.g., by making them unnecessary) because guards are always executed.

Optimistic Native Built-ins

The mechanism described above may be extended, in some embodiments. For example, builtins may be treated like String.fromCharCode, such as be treating them as returning an integer (char), which is typically the case, instead of using a single character string as the return value, which is traditionally the case.

In general, in some embodiments, optimism may be utilized with the builtin implementations of scripting language functions (such as Java implementations of JavaScript functions) using the optimistic type assumptions and recompilation techniques described herein. For example, in some embodiments, this may be immediately applicable to all builtins that are purely functional in character (i.e. that don't modify the script object receiver).

Furthermore, in some embodiments, recompilation may be implemented even if the functions change object state.

Type Profiling

Optimistically assuming types when generating bytecode for a dynamically typed language may involve the use of type profiling and may also involve making a determination as to whether or not the benefit of type profiling outweighs the cost. For instance profile data may be used to aid in the selection of a particular type assumption.

The use of type profiling may be an optimization in various compilers, such as in just-in-time (JIT) compilers. Type profiling data may be collected as a virtual machine runs the application at a low level of optimization. When sufficient data is available, an aggressive JIT compiler may take advantage of the profiling data to generate code tailored to the observed execution patterns. Taking advantage of the profiling data may incur a cost (e.g., due to the need for the compiler to emit a runtime check to validate the profiling data) so a compiler may determine whether or not to employ type profiling based on that cost (e.g., the compiler may decide whether or not employing type profiling provides enough of a benefit to outweigh the cost). Profiling data may be available to the compiler at the profiling point where it was collected (e.g., at a method call, type check, etc.) and balancing the benefit from using the profile data against the cost incurred may be straightforward in some embodiments. For example, determining whether the benefit of allowing inlining or providing a simpler, stronger type check due to profiling may outweigh the cost of that profiling (e.g., in term of runtime checks).

For dynamically typed languages, the approach summarized above may be insufficient. For instance, in some embodiments, the number of program points where profiling would be helpful may increase while the accuracy of the data collected may decrease due to profile pollution. One solution may involve collecting data at profiling points that are more generic (e.g., parameters on method entry, return values from calls, arguments to calls, etc.) and making profiling data available to the compiler at every program point during compilation, such as by utilizing (e.g., by piggy backing on) the compiler's type system. This may help fight profile pollution (e.g., the outer most context may provide accurate data) and a lack of profiling at some program points (e.g., profiling data is available at every program point during compilation). The compiler may only emit a runtime check when it uses the profiling data at a program point where it would be useful. As a consequence, it may remain straightforward to determine whether or not to use type profiling (e.g., whether the benefit outweighs the cost of using profiling data) even when using profiling data that was not collected at the point being optimized.

Statically Proving Types of Local Variables in Functions of a Program Written in a Dynamic Language.

Optimistic type assumptions may involve a method for statically proving types of local variables in functions of a program written in a dynamic language. In some embodiments, this may be similar to type inference in static languages, but the type of a single variable may change over time. Both the potentially different type for the variable in different portions of the function code, as well as the necessary type widening conversion at control flow join points may be calculated, according to some embodiments. Additionally, special provisions may be defined in try blocks and applied for uses of values in catch blocks.

Performance Enhancement of the Runtime Architecture

An execution engine, such as a script engine, may need to cooperate with a virtualized runtime environment, such as a virtual machine, to produce more highly performant code, in some embodiments. Native scripting language runtimes typically outperform a script engine on many tasks, such as pure number crunching. In some embodiments an execution engine may be configured to generate optimistic bytecode (e.g., bytecode that uses one or more optimistic type assumptions). For instance, insufficient type information may be statically proven by the language compiler and therefore one or more optimistic type assumptions may be used when generating and/or interpreting the source code.

In some embodiments, bytecode generated by an execution engine may contain as many primitive unboxed operations as possible and runtime data structures may make use of that fact. Additionally, bytecode generated by an execution engine may use as much native (e.g., Java) integer arithmetic as possible, such as by utilizing one or more optimistic type assumptions. In some embodiments, bytecode generated by an execution engine may change and/or revert optimistic assumptions of the above type using a continuation passing/exception throwing mechanism, such as that described herein. This may be necessary in some embodiments when an integer instruction cannot be switched to another instruction (e.g., a double instruction) in bytecode without causing verify errors or when having to modify a method on the fly.

In some embodiments, one or more built in library functions in (or used by) an execution engine (e.g., a script engine) may utilize or be implemented using a native language (e.g., Java) and may use primitive types well (e.g., efficiently). In some embodiments, the virtual machine may optimize non-native (e.g., "alien"—from another language) bytecode which has similar problems, such as by using one or more optimistic type assumptions.

Traditionally, the use of Object operations (e.g., a-prefixed bytecodes) and invokedynamic frequently produces bytecode that may run too slowly on certain virtualized runtime environments (e.g., virtual machines). In some embodiments, this may be overcome by generating bytecode that contains as many primitives as possible (e.g., via optimistic type assumptions) and by being able to revert (e.g., deoptimize) code when a type assumption about a primitive type proves invalid.

In some embodiments, optimistic methods (e.g., that utilize optimistic type assumptions) may be generated based on callsite types known at runtime. For instance, if a method is called with integer parameters, a specialized, optimistic, function may be generated for that method.

Intra-method code that is more optimistic may also be generated, in some embodiments. For instance, integer addition may be used even when the compiler can't statically prove that ints are being used, by selecting int as part of an optimistic type assumption. If that assumption is incorrect (e.g., if the type assumption proves invalid), an exception/continuation passing mechanism that generates a new method with wider (e.g., less optimistic) types for the erroneous assumption may be built and control may be passed to an equivalent program point in a new, less optimistic, version of the method, according to some embodiments.

The following description provides one example of using optimistic type assumptions, according to one embodiment:

When using a dynamically-typed language, such as a scripting language (e.g., JavaScript), it may be impossible to precisely infer the data type of many expressions statically (e.g., prior to execution). Such expressions may, in some embodiments, be conservatively (e.g., less optimistically) treated as Objects. However, such treatment may severely reduce performance (e.g., execution speed).

The following sample code provides one example, according to one embodiment:

```
function am3(i,x,w,j,c,n) {
    var this_array = this.array;
    var w_array   = w.array;
    var xl = x&0x3fff, xh = x>>14;
    while(--n >= 0) {
        var l = this_array[i]&0x3fff;
        var h = this_array[i++]>>14;
        var m = xh*l+h*xl;
        l = xl*l+((m&0x3fff)<<14)+w_array[j]+c;
        c = (l>>28)+(m>>14)+xh*h;
        w_array[j++] = l&0xffffffff;
    }
    return c;
}
```

As shown in the above example, the w_array expression may be an array of 32-bit integers, but there may be no way of proving it (e.g., statically). Thus, every w_array may have to be treated as if it were returning an Object, according to some embodiments. Treating the example w_array as if it were returning an Object may be Of special interest are the element access operations to the w_array expression: while it's an array of 32-bit integer, there may be no way of proving it (e.g., by the compiler) and therefore every w_array may have to be treated as if it were returning an Object. For example, this may be particularly troublesome in the following example expression:

$$l=xl*l+((m\&0x3\mathit{fff})<<14)w\_array[j]+c$$

In the above example expression, a traditional compiler may have to utilize an Object addition function for all " " operators, such as ScriptRuntime.ADD(Object, Object) as one example. Additionally a traditional compiler may use an implementation of a polymorphic "+" operator instead of using more efficient operations (such as IADD or even DADD). For instance, the traditional compiler may not be able to eliminate the theoretical possibility of w_array[j] returning a non-numeric type (e.g., a string, or other object). In such a cause a string concatenation operation would have to be used to implement the "+" operator.

However, in some embodiments a compiler may utilize optimistic assumption that expressions return the most efficient type that can be used at their site. Thus, in the example above, w_array[j] may be compiled to an INVOKEDYNAMIC that will return an int, and a subsequent IADD, as shown in the example below:

```
...
ALOAD w_array
ILOAD j
INVOKEDYNAMIC dyn:getElem(I)I
...
IADD
...
```

In some embodiments, a compiler may utilize optimistically assumed types, but may need to replace the executing bytecode if the assumption proves invalid (e.g., a non-int is returned from the INVOKEDYNAMIC method). In some cases an assumption may prove invalid because type assumptions are built into the bytecode (e.g., IADD is used for addition of the returned value and the return type of the INVOKEDYNAMIC call site is also I). However, if the return type of the dynamic call site is integer, the only way it can return a non-integer value, in some embodiments, may be by throwing an exception, such as an UnwarrantedOptimismException described above.

In some embodiments, this exception may be referred to as an UnwarrantedOptimismException. A unique identifier of the program restart point may also be encoded into the call site flag or other static bootstrap method data. For example, in one embodiment, a sequential ordering of optimistic call sites may be used to produce unique identifiers for program restart points. In some embodiments, when the UnwarrantedOptimismException exception is thrown, it may be provided the program restart point ID and the returned value, as illustrated in the following example code:

```
public class UnwarrantedOptimismException extends Exception {
    ...
    public int getProgramRestartPointId( ) { ... }
    public Object getReturnedValue( ) { ... }
}
```

When an UnwarrantedOptimismException is thrown, the dynamically invoked method completed successfully but the return value (or result value) type does not match what was expected based on the optimistic type assumption.

Gathering Execution State and Throwing a RewriteException

Figure 8:
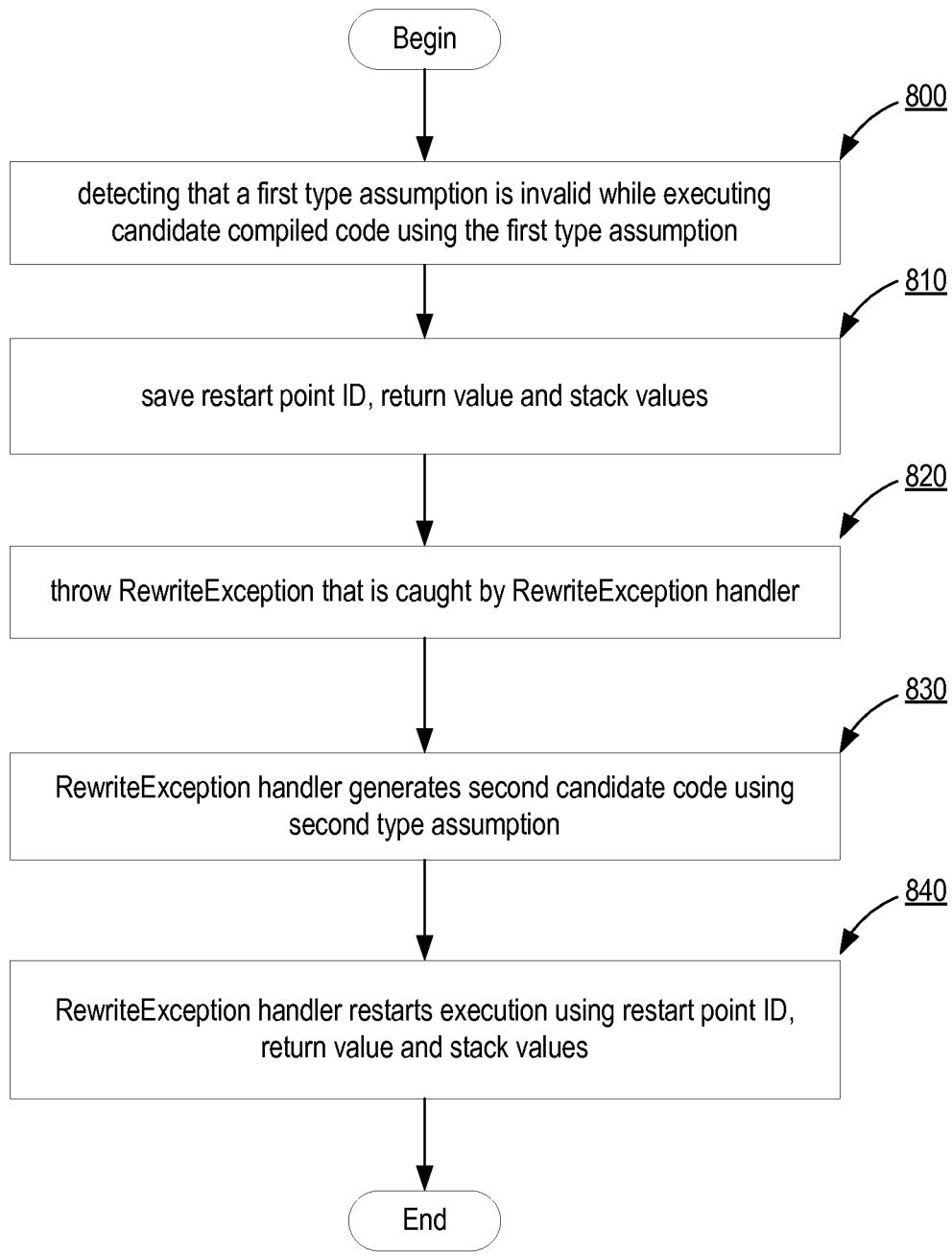
FIG. 8 is a flowchart illustrating one embodiment of a method for restarting execution using once-restartable, single-frame deep continuations.

FIG. 8 is a flowchart illustrating one embodiment of a method for continuing execution when regenerating compiled code as part of optimistic type assumptions. As shown in block 800, when executing candidate compile code using a first type assumption it may be detected (e.g., determined) that the first type assumption is invalid. For example, as discussed above, an overflow condition and/or type mismatch may be detected during execution, according to some embodiments.

As noted above, in response to detecting an invalid type assumption, the candidate code using the first type assumption may be at least partially replaced with candidate code using a second type assumption and execution may be restarted. In order to ensure proper continuation (e.g., without loss of data or unexpected results), data representing an execution state of the currently executing code may be preserved and used when restarting execution. According to some embodiments, computation may always be restarted with the instruction immediately following the overly optimistic instruction (e.g., the instruction at which the optimistic type assumption was proved invalid), thereby possibly voiding evaluating the instruction twice. This may avoid issued dealing with the fact that the instruction may have side effects that may be incorrect if performed more than once.

Thus, as illustrated by block 810, the restart point ID, return (or result) value, local variables and/or stack values may be saved. For example, the restart point ID, return value, local variables and/or stack values may be loaded from the stack to temporary variables (e.g., such as one or more local variables) or as elements in a single table, object or array, according to various embodiments. As described above, a newly compiled continuation method that performs the same operations as the remainder of the currently executing method but using a different type assumption may be generated. In order for the continuation method to function properly (e.g., without unwanted side effects), the execution state (e.g., restart point, return value, local variables and/or stack values) of the currently executing method may be preserved for use when executing the continuation method.

In order to restart execution with the immediately following instruction, the exception may have to carry the return value of the instruction at which the UnwarrantedOptimismException was thrown. As noted above, the invoked operation successfully completed and a value was returned, but the returned value was not of the expected type (based on the optimistic type assumption). Thus, in some embodiments, the value may be preserved via the UnwarrantedOptimismException and RewriteException.

In some embodiments, exception throws may erase the operand stack. Therefore, the stack may have to be rebuilt to the state it had at the point the UnwarrantedOptimismException was thrown and which it needs to have at the computation restart point. However, there may be a value on the stack resulting from some computation that can have side effects (i.e. a return value of a function call). Therefore, re-evaluation of these values may have to be avoided (i.e., to avoid having the side effect occur twice). In some embodiments, whenever such a value is loaded on the stack, a DUP, STORE sequence may be used to store the value into a separate local variable (or other temporary variable). Thus, the local variable capture mechanism described above may store stack values into the RewriteException exception.

In one embodiment the restart point ID, returned value, stack values, and/or local variable values may be added to and communicated via the Rewrite Exception. Thus, after the execution state information (e.g., program restart point ID, returned value, local variable values, etc.) are added to the RewriteException, the exception may be thrown, as illustrated by block 820. Once the RewriteException is thrown and caught by a RewriteException handler, as shown in block 820, the RewriteException handler may cause the second candidate code to be generated using a second type assumption, as shown in block 830 and according to some embodiments. For example, the RewriteException handler may generate a new method to replace the currently executing method, such as by rewriting and recompiling source code for the currently executing method (as well any other method that relies on the same type assumption for the same element) using a different (e.g., wider or less optimistic) type assumption.

As shown in block 840, the RewriteException handler may restart execution using the execution state information (e.g., restart point ID, return value, local variable values and/or stack values). As described above, execution may be restarted such that execution continues from a point at which the invalidity of the first type assumption was detected. The continuation method may, or may not, contain any optimistically typed call sites, and therefore may or may not throw a RewriteException, according to various embodiments.

In some embodiments, the continuation version of the method may not take any parameters of the original method. Instead, the continuation version may only have a single parameter, such as one of type RewriteException, according to some embodiments. Its bytecode may be similar to the bytecode of the original method. However, it may contain a special prologue that may utilize the execution state preserved across the regeneration, such as to restore the values of local variables from the exception, reconstruct the operand stack corresponding to the program restart point ID (also stored in the exception), and jump to the instruction corresponding to the program restart point ID, according to one embodiment. For example, a method prologue that does appropriate LOAD operations to restore the stack may be used as part of the continuation method.

While the discussion above regarding FIG. 8 describes one particular example method (or mechanism) for preserving the execution state in order to restart execution at the point at which an invalid type assumption was detected, other method, techniques and or mechanisms may be utilized to restart execution, according to various embodiments. For instance, in some embodiments invalid type assumptions may be detected and changed without using two exceptions and using some other method to preserve (and/or communicate) the execution state.

Figure 9:
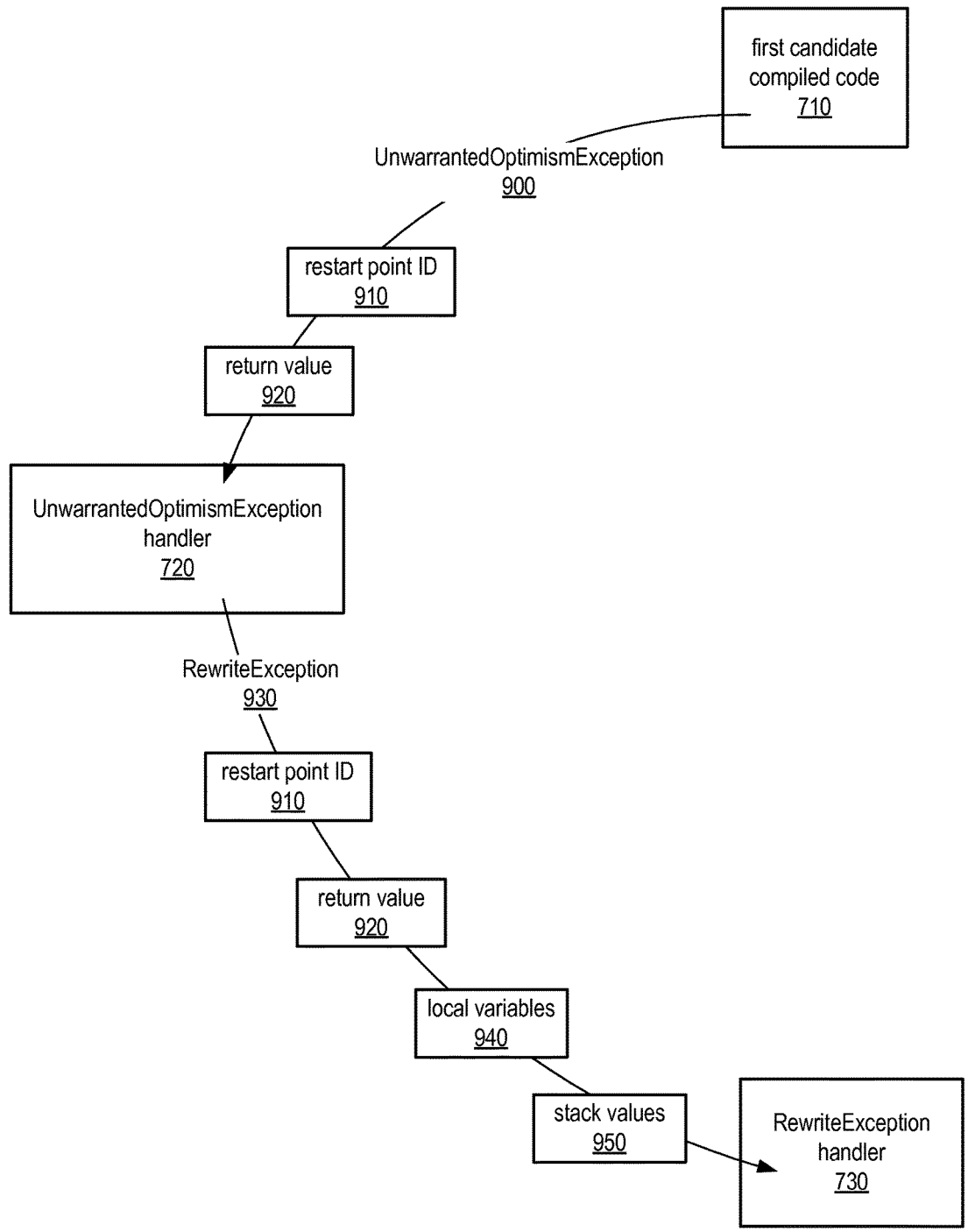
FIG. 9 is a logical block diagram illustrating the use of multiple exceptions to restart execution as part of optimistic type assumption, according to one embodiment.

As described above, when replacing an invalid type assumption with a different (generally less optimistic) type assumption, may involve restarting execution using an execution state saved from the first candidate compiled code (e.g., for which the type assumption was invalid). FIG. 9 is a logical block diagram illustrating the use of multiple exceptions to restart execution as part of optimistic type assumption, according to one embodiment. As described above, when a type assumption is determined to be invalid, such as in first candidate compiled code 710, an UnwarrantedOptimismException 900 may be thrown.

The UnwarrantedOptimismException handler 720 may be configured to obtain the restart point ID 910 as well as the return value 920. Return value 920 may be a value resulting from execution of the operation that caused the type assumption to be invalidated. As noted above, in some embodiments, a unique identifier (e.g., such as from a sequential ordering of optimistic call sites) of the program restart point may be encoded into the call site flag or other static bootstrap method data.

Additionally, UnwarrantedOptimismException handler 720 may also be configured to save other state information, such as the value of local variables and/or stack values. In one embodiment, the UnwarrantedOptimismException handler may then throw a RewriteException 930, providing RewriteException Handler 730 with restart point ID 910, return value 920, local variables 940 and stack values 950.

Thus, between UnwarrantedOptimismException handler 720 and RewriteException Handler 730, state information representing the execution state of the candidate compiled code at the point when the invalid type assumption was detected may be saved and used when restarting execution.

Reducing the Number of Optimistically Typed Callsites

In some embodiments, optimistically typed call sites (e.g., operations relying on an optimistic type assumption) may only be introduced as needed. For example, they may only be needed for expressions that used in polymorphic expressions (e.g., the "+" operator, the comparison operators, etc.). Operators that would coerce their operands into a number anyway may not need to use optimistic call sites, according to some embodiments. For instance, in "a+array[j]", the array[j] may need to be optimistically typed, while in "array[j] & 0xff" it perhaps shouldn't be optimistically typed since the & operator coerces its values to an integer anyway. Thus, in some embodiments, optimistic type assumptions may only be used for operators that behave differently for different types.

Classic IR Optimizations

In some embodiments, classic code optimizations may be performed in the byte code while utilizing optimistic type assumptions, as illustrated by the following example code:

```
var sum = 0;
    for (i = 0; i < 10; x++) {
        sum += y;
    }
```

In some embodiments, y may be checked to determine whether or not it causes any side effects. If, in the above example, y is not a method with side effects and with valueOf overridden, the code may be modified into:

```
var sum = 0;
var ytmp = y;    // which will throw UnwarrantedOptimismException
                 // if y is not a nice primitive
for (i = 0; i < 10; x++) {
    sum += ytmp;
}
```

While the methods, techniques and/or features described herein generally refer to starting with a more optimistic type assumption and replacing it, if needed, with a less optimistic type assumption, in some embodiments, the methods, techniques and/or features described herein may be used to replace a less optimistic type assumption with a more optimistic type assumption. For instance, as part of type profiling, a system may determine that a program element that is currently treated as a less optimistic type (e.g., a double or an Object) may be replaced with a more optimistic type (e.g., a long or int), such as based on type profiling data. In general, the methods, techniques and/or features described herein may be used to replace virtually any type assumption with any other type assumption, according to various embodiments.

Example Computer System

Figure 10:
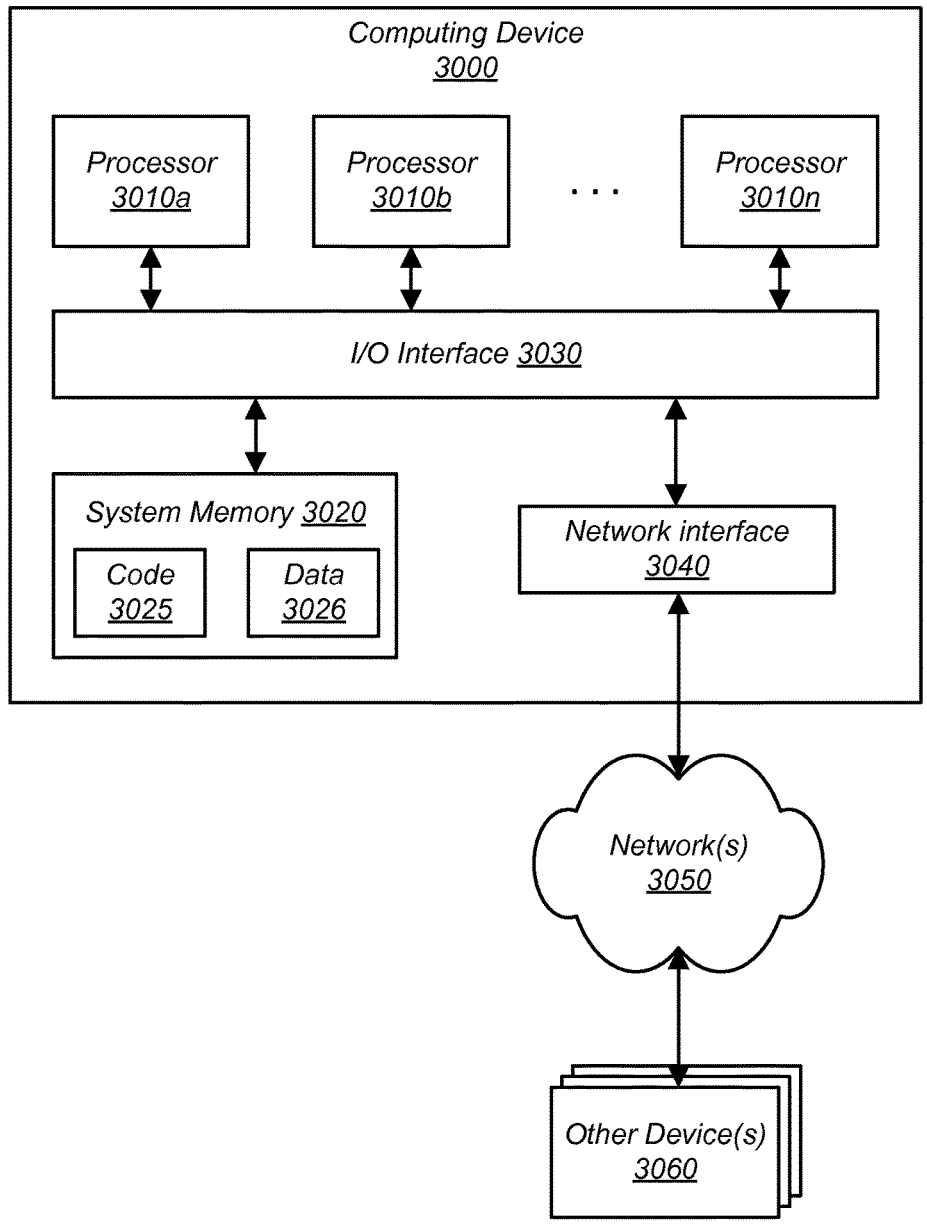
FIG. 10 is a block diagram illustrating one embodiment of a computer system suitable for implementing methods and features described herein.

In at least some embodiments, a computer system that implements a portion or all of one or more of the technologies described herein may include a general-purpose computer system that includes or is configured to access one or more computer-readable media. FIG. 10 illustrates such a general-purpose computing device 3000 suitable for implementing the method, features and enhancements described herein. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 (i.e., program instructions) and data 3026. For example, memory 3020 and well as code 3025 and data 3026 may store, in one embodiment, program instructions and data for implementing compiler 120 and/or virtual machine 150, described above.

In various embodiments, compiler 120 and/or virtual machine 150 (and/or any individual sub-modules thereof) may each be implemented in any of various programming languages or methods. For example, in one embodiment, compiler 120 and/or virtual machine 150 may be written in any of the C, C++, assembly, JAVA or other general purpose programing languages, while in another embodiment, one or more of them may be written using a different, more specialized, programming language. Moreover, in some embodiments, compiler 120 and/or virtual machine 150 (and/or various sub-modules thereof) may not be implemented using the same programming language.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1, for example. In various embodiments, network interface 3040 may support communication via any suitable wired or wireless general data networks, such as types of Ethernet network, for example.

In some embodiments, system memory 3020 may be one embodiment of a computer-readable (e.g., computer-accessible) medium configured to store program instructions and data as described above with respect to FIG. 1 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. For example, actions, processes, methods, tasks or functions described herein as being performed by compiler 120 may, in some embodiments, be performed by virtual machine 150 and vice versa. Additionally, functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of examples that follow. Finally, structures and functionality presented as discrete components in the exemplary configurations may be implemented as a combined structure or component.

Although the embodiments above have been described in detail, numerous variations and modifications will become apparent once the above disclosure is fully appreciated. It is intended that the following claims be interpreted to embrace all such variations and modifications.

What is claimed is:

1. A non-transitory, computer-readable storage medium storing program instructions that when executed on a computing device cause the computing device to implement:
    parsing, by a compiler, source code written in a dynamically typed language;
    determining, by the compiler, an element of the source code that has a unspecified type, wherein the element results from an operation in the source code, wherein the element has a type unspecified to the compiler; and
    in response to said determining, generating, by the compiler using a first type assumption that treats the element as a first candidate type, first candidate compiled code which upon execution by an execution engine is configured to:
        detect, during execution of the first candidate compiled code, that the first type assumption is invalid for the first candidate compiled code;
        in response to detecting that the first type assumption is invalid:
            replace at least a portion of the first candidate compiled code with second candidate compiled code that treats the element as a second candidate type according to a second type assumption; and
            execute the second candidate compiled code such that execution continues from an execution point in the second candidate compiled code that matches an execution point in the first candidate compiled code at which the invalidity of the first type assumption was detected.

2. The non-transitory, computer-readable storage medium of claim 1, wherein to execute the second candidate compiled code, the first candidate compiled code is configured to: configure an execution state for the second candidate compiled code based on an execution state of the first candidate compiled code at the execution point in the first candidate compiled code at which the invalidity of the first type assumption was detected, wherein the execution state for the first candidate compiled code comprises one or more of:
    a result of the operation;
    one or more stack values regarding execution of the first candidate compiled code;
    one or more local variables of the first candidate compiled code; or
    a restart point identifier indicating the execution point in the first candidate compiled code at which the invalidity of the first type assumption was detected.

3. The non-transitory, computer-readable storage medium of claim 1, wherein the second candidate compiled code comprises:
    a replacement method that matches a method of the first candidate compiled code, wherein the method of the first candidate compiled code includes the operation; and
    a continuation method that matches only a portion of the method of the first candidate compiled code wherein when executed the continuation method begins execution at an execution point that corresponds to the execution point in the first candidate compiled code at which the invalidity of the first type assumption was detected.

4. The non-transitory, computer-readable storage medium of claim 1, wherein to detect that the first type assumption is invalid, the first candidate compiled code is further configured to detect one of:
    a type mismatch from executing the operation; or
    an overflow condition resulting from executing the operation.

5. The non-transitory, computer-readable storage medium of claim 1, wherein the first candidate compiled code is further configured to select the second type assumption and the second candidate type based, at least in part, on one or more of: the operation, or a result of the operation.

6. The non-transitory, computer-readable storage medium of claim 1, wherein the operation comprises one or more of: an arithmetic operation, a relational operation, a logical operation, an assignment operation, a conditional operation, a ternary operation, or an instanceof operation.

7. The non-transitory, computer-readable storage medium of claim 1, wherein the dynamically typed language is one: JavaScript, Perl, PHP, or Ruby.

8. The non-transitory, computer-readable storage medium of claim 1, wherein the first candidate type comprises a primitive type or a low-overhead type, and wherein the second candidate type comprises an object type.

9. The non-transitory, computer-readable storage medium of claim 1, wherein to replace the at least a portion of the first candidate compiled code, the first candidate compiled code is further configured to:
    modify, by the first candidate compiled code, the first candidate compiled code according to the second type assumption to generate the second candidate compiled code.

10. A computing device, comprising:
    a processor; and
    a memory comprising program instructions, that when executed on the processor cause the processor to:
    execute first candidate compiled bytecode configured to:
        detect that a first type assumption is invalid for first candidate compiled bytecode, wherein the first candidate compiled bytecode is generated from source code written in a dynamically typed language using the first type assumption and treating an element resulting from an operation in the first candidate compiled bytecode as a first candidate type according to the first type assumption;

in response to detecting that the first type assumption is invalid:
    replace at least a portion of the first candidate compiled bytecode with second candidate compiled bytecode that treats the element as a second candidate type according to a second type assumption; and
    execute the second candidate compiled bytecode such that execution continues from an execution point at which the invalidity of the first type assumption was detected.

11. The computing device of claim 10, wherein to detect that the first type assumption is invalid, the first candidate compiled bytecode is further configured to detect, by an exception handler of the first candidate compiled bytecode, an overflow condition for the element resulting from executing the operation with the first type assumption.

12. The computing device of claim 11, wherein the first candidate compiled bytecode is further configured to:
obtain a result value resulting from execution of the operation;
store the result value in the element prior to executing the second candidate compiled bytecode; and
wherein the overflow condition is caused, at least in part, by the first candidate type being invalid for the result value, wherein the second candidate type is valid for the result value.

13. The computing device of claim 10, wherein to detect that the first type assumption is invalid, the first candidate compiled bytecode is further configured to detect a type mismatch resulting from executing the operation with the first candidate type.

14. The computing device of claim 10, wherein the first candidate compiled bytecode is further configured to implement one or more exception handlers configured to:
detect one or more exceptions thrown in response to detecting that the first type assumption is invalid;
replace the at least a portion of the first candidate compiled bytecode with the second candidate compiled bytecode; and
execute the second candidate compiled bytecode.

15. The computing device of claim 14, wherein the second candidate compiled bytecode is configured to:
detect that the second type assumption is invalid for the second candidate compiled bytecode;
replace at least a portion of the second candidate compiled bytecode with third candidate compiled bytecode that treats the element as a third candidate type according to a third type assumption; and
execute the third candidate compiled bytecode such that execution continues from an execution point at which the invalidity of the second type assumption was detected.

16. A method performed by one or more computing devices, comprising:
detecting, during execution of first candidate bytecode compiled using a first type assumption that treats an element of the first candidate bytecode as a first candidate type, that a first type assumption is invalid for the first candidate bytecode, wherein the first candidate bytecode is compiled from source code written in a dynamically typed language;
in response to said detecting:
    throwing a first exception indicating that the first type assumption is invalid for the first candidate bytecode, wherein a first exception handler is configured to catch and process the first exception;
    in response to catching the first exception by the first exception handler:
        throwing, by the first exception handler, a second exception indicating that at least a portion of the first candidate bytecode should be replaced by candidate bytecode that treats the element as a different type, wherein a second exception handler is configured to catch and process the second exception;
    in response to catching the second exception by the second exception handler:
        replacing, by the second exception handler, at least a portion of the first candidate bytecode with second candidate bytecode, compiled using a second type assumption, that treats the element as a second candidate type; and
        executing, by the second exception handler, the second candidate bytecode such that execution continues from an execution point in the second candidate bytecode that matches an execution point in the first candidate bytecode at which the first exception was thrown.

17. The method of claim 16, wherein said detecting and said throwing the first exception are based, as least in part, on an operation returning an return value requiring a type that does not match the first candidate type, the method further comprising:
passing the return value to the first exception handler via the first exception;
passing the return value to the second exception handler via the second exception; and
wherein said executing the second candidate bytecode comprises setting, by the second exception handler, the element to the return value.

18. The method of claim 16, further comprising:
passing to the first exception handler a restart point identifier indicating the execution point in the first candidate bytecode at which the first exception was thrown;
passing the restart point identifier to the second exception handler; and
wherein said executing the second candidate bytecode is based, at least in part, on the restart point identifier.

19. The method of claim 16, further comprising:
saving to one or more temporary variables, by the first exception handler, one or more stack values from a stack associated with executing the first candidate bytecode;
passing the one or more temporary variables to the second exception handler; and
wherein said executing the second candidate bytecode comprises storing the one or more stack values to a stack associated with executing the second candidate bytecode such that the stack associated with executing the second candidate bytecode includes a same set of values as the stack associated with executing the first candidate bytecode at the execution point in the first candidate bytecode at which the first exception was thrown.

20. The method of claim 16, further comprising:
saving to one or more temporary variables, by the first exception handler, values of one or more local variables associated with executing the first candidate bytecode;
passing the one or more temporary variables to the second exception handler; and
wherein said executing the second candidate bytecode comprises storing the values of the one or more local variables associated with executing the first candidate bytecode from the one or more temporary variables to one or more local variables associated with executing the second candidate byte code.

* * * * *

UNITED STATES PATENT AND TRADEMARK OFFICE
CERTIFICATE OF CORRECTION

| | | |
|---|---|---|
| PATENT NO. | : 9,760,350 B2 | Page 1 of 1 |
| APPLICATION NO. | : 14/743912 | |
| DATED | : September 12, 2017 | |
| INVENTOR(S) | : Lagergren et al. | |

It is certified that error appears in the above-identified patent and that said Letters Patent is hereby corrected as shown below:

In Column 27, Line 35, delete "and or" and insert -- and/or --, therefor.

Signed and Sealed this
Twenty-second Day of May, 2018

Andrei Iancu
*Director of the United States Patent and Trademark Office*